United States Patent [19]

Naito et al.

[11] Patent Number: 4,981,760

[45] Date of Patent: Jan. 1, 1991

[54] ETHYLENE-ALPHA-OLEFIN COPOLYMER AND FILMS OBTAINED THEREFROM

[75] Inventors: Yukio Naito; Kohzoh Miyazaki; Yuji Gotoh; Masashi Hamba; Akio Imai; Kiyoyuki Sugimori, all of Chiba, Japan

[73] Assignee: Sumitomo Chemical Company, Limited, Osaka, Japan

[21] Appl. No.: 378,000

[22] Filed: Jul. 11, 1989

[30] Foreign Application Priority Data

Jul. 11, 1988 [JP] Japan ................................ 63-173148

[51] Int. Cl.$^5$ ...................... B32B 27/32; C08L 23/08; C08F 210/02
[52] U.S. Cl. ................................... 428/523; 428/500; 525/240; 526/143; 526/348.3; 526/348.5; 526/348.6; 526/352.2
[58] Field of Search .................. 526/143, 348.1, 348.5, 526/348.6, 348.3, 352.2; 525/240; 428/212, 218, 500, 523

[56] References Cited

U.S. PATENT DOCUMENTS 4,438,238  3/1984  Fukushima et al. ................ 525/240

FOREIGN PATENT DOCUMENTS

| 1569833 | 6/1969 | France | 526/143 |
| 46-21212 | 6/1971 | Japan | 526/348.1 |
| 57-37616 | 8/1982 | Japan | 526/348.1 |
| 56-66405 | 4/1984 | Japan | 526/348.1 |
| 60-88016 | 5/1985 | Japan | 526/348.1 |

*Primary Examiner*—Fred Teskin
*Attorney, Agent, or Firm*—Sughrue, Mion, Zinn, Macpeak & Seas

[57] ABSTRACT

An ethylene-α-olefin copolymer comprising ethylene and an α-olefin having from 3 to 10 carbon atoms, the copolymer having an α-olefin content of from 1.0 to 8.0 mol %, a density of from 0.900 to 0.930 g/cm$^3$, and a melt flow rate of from 0.1 to 100 g/10 min., the programed-temperature thermogram of said copolymer as determined with a differential scanning calorimeter after being completely melted and then gradually cooled showing an endothermic peak (a) in a range of from 75° to 100° C. and an endothermic peak (b) in a range of from 120° to 140° C., with the ratio of an endotherm at the endothermic peak (b), ΔHb, to an endotherm at the endothermic peak (a), ΔHa, i.e., ΔHb/ΔHa, being from 0.03 to 2.0. The copolymer provides a film exhibiting excellent physical properties required for packaging film.

8 Claims, 6 Drawing Sheets

ETHYLENE-ALPHA-OLEFIN COPOLYMER AND FILMS OBTAINED THEREFROM

FIELD OF THE INVENTION

This invention relates to an ethylene-α-olefin copolymer, a low-density polyethylene film, and a polyethylene mixture. More particularly, it relates to an ethylene-α-olefin copolymer, a low-density polyethylene film, and a polyethylene mixture each of which highly satisfies performance properties required for use as packaging films, such as heat-sealing properties, transparency, gloss, nerve, impact strength, and tearing strength.

BACKGROUND OF THE INVENTION

Low-density polyethylene exhibits excellent water- and moisture-resistance, moderate softness, relatively good transparency, and relatively satisfactory strength and has therefore been used widely in the form of a film. In addition, since the low-density polyethylene is heat-sealable at temperatures of from a relatively low temperature and exhibits satisfactory heat-sealing strength, it is widespread as a single-layer packaging film or a packaging film laminate.

In recent years, a demand for a packaging film applicable to high-speed filling has been increasing. Speeding up of filling can be realized by speeding up of film delivery, reduction of heat-sealing time, and reduction of time of immediately from heat sealing to imposition of a load of a content on the sealed area. To this effect, a packaging film material is required to have nerve, to have low heat-sealing temperatures, and to exhibit satisfactory hot tack, i.e., to provide a sealed area that is not separated even when a load of a content is imposed thereon while being hot immediately after heat sealing. When composite films are produced by a lamination process, which is currently employed because it has a wide choice in the kind of film materials to be combined with and provides a composite film which can be beautifully printed, nerve of a low-density polyethylene film as a lamina is an important factor for achieving high-speed processing in that a lack of nerve easily causes wrinkles. Further, transparency and gloss are of importance for addition of a display effect to the content of package. Resistance to impact or tearing in any direction is also important as well for improving the essential packaging function of protection of the content.

Low-density polyethylene is divided into two large groups according to the process for production or molecular structure. One group is an ethylene polymer produced by free radical polymerization under high pressure and high temperature conditions, which essentially has short-chain branches and long-chain branches. It is considered that the short-chain branches and long-chain branches are formed through intramolecular rearrangement reaction and intermolecular rearrangement reaction, respectively, of a polymer radical under propagation. Since an α-olefin exhibits a high chain transfer constant in radical polymerization, it is present in a copolymerized state in high-molecular weight low-density polyethylene to be used as a synthetic resin in only a few proportion, if any. The other group is an ethylene-α-olefin copolymer produced by copolymerization in the presence of a transition metal catalyst, typically by a Ziegler process. By copolymerization with an α-olefin, short-chain branches whose carbon atom number is less than the α-olefin by two are formed, thereby decreasing the polymer density.

Generally having no long-chain branches, the latter polyethylene is called linear low-density polyethylene (L-LDPE). The former polyethylene has been simply called low-density polyethylene because it was invented before the latter, but will be hereinafter referred to as branched low-density polyethylene (B-LDPE) for distinction from L-LDPE.

In general, a high-molecular weight substance is a mixture of various molecules, and it is widely accepted that various physical properties very depending on a distribution mode of the molecules. Hence, analysis of the distribution mode, quantitative and structural elucidation of the relation between the distribution mode and various physical properties, and discoveries of high-molecular weight substances having a novel distribution mode and thereby exhibiting improved physical properties constitute one of the central subjects on high polymer science for both learning and industry.

With respect to low-density polyethylene, a molecular weight distribution and a distribution of short-chain branching coefficient are important factors for physical properties. It is known that B-LDPE has a broad molecular weight distribution and a relatively narrow short-chain branching coefficient distribution while L-LDPE generally has a relatively broad short-chain branching coefficient distribution as reported, e.g., in S. Hosoda, *Polymer J.*, Vol. 20, p. 383 (1988). Since the short-chain branching in L-LDPE arises through copolymerization of an α-olefin as a comonomer, the short-chain branching coefficient distribution of L-LDPE is sometimes referred to as a comonomer distribution or (copolymerization) composition distribution.

There is an extensive literature concerning the relationship between the composition distribution and physical properties in L-LDPE. JP-B-56-21212 (the term "JP-B" as used herein means an "examined Japanese publication") is one of the earliest literatures pointing the importance of comonomer distribution in partially crystalline ethylene-α-olefin copolymers. According to the disclosure, an extruded film of a copolymer having uniform comonomer distribution among molecules is superior to that of a non-uniform copolymer in terms of haze, impact strength, and balance of physical properties between the machine direction and the cross direction as demonstrated in the working examples in which films obtained by blow molding of uniform or non-uniform copolymers having a melt index of around 2 and a density of around 0.919 are evaluated for physical properties. The copolymers having a uniform comonomer distribution used therein are obtained by copolymerizing ethylene and an α-olefin in the presence of a catalyst prepared by mixing a specific organic aluminum compound and a specific vanadium compound. It is also disclosed in this reference that uniformity of comonomer distribution can be distinguished by a relationship between density and melting point of the copolymer as depicted by the accompanying drawing. That is, the density of the uniform copolymer is lower than that of the non-uniform copolymer having the same comonomer content. The reference nevertheless gives no description about heat-sealing properties and hot tack as important properties of a low-density polyethylene film. Neither does it refer to utility as composite films. As illustrated in the Comparative Examples of the present specification hereinafter described, a uniform copolymer has an extremely narrow range of heat-sealing temperature within which satisfactory hot tack is obtained and is also insufficient in heat-sealability at low temperatures in spite of low rigidity. Notwithstanding the above-described relatively excellent properties, the uniform copolymer is of virtually no practical use as packaging film.

JP-A-59-66405 (the term "JP-A" as used herein means an "unexamined published Japanese patent application") discloses that a copolymer film comprising ethylene and an α-olefin having 4 or more carbon atoms and having plural melting points exhibits excellent heat-sealability at low temperatures and still possesses high heat resistance. All the copolymers described in the working examples of this reference have three melting points but their maximum melting point does not exceed 124° C., with the minimum melting point being between 104° C. and 106° C. However, there is given no description of hot tack or utility as composite films.

JP-A-60-88016 describes that an ethylene-α-olefin random copolymer specified in composition distribution, branching coefficient distribution, randomness, DSC (differential scanning calorimetry) melting point, crystallinity, molecular weight distribution, etc. is excellent in mechanical characteristics, optical characteristics, anti-blocking properties, heat resistance, and low-temperature heat-sealability in a good balance. With respect to the composition distribution, it is made an essential condition that a composition distribution parameter derived from a specific means should not exceed a specific value, which condition means that the composition distribution must be sufficiently narrow. With respect to the DSC characteristics, it is essentially required that the maximum melting point should be in a specific range not high than 125° C.; the difference between the maximum melting point and the minimum melting point should be in a specific range; the difference between the maximum melting point and the second maximum melting point should be in a specific range; and the quantity of heat of crystal fusion at the maximum melting point is below a specific ratio to the total quantity of heat of crystal fusion. These essential requirements imply that the copolymer is the non-uniform copolymer as designated in JP-B-46-21212 but should be near to the uniform copolymer. It is also described that the film properties, such as low-temperature heat-sealability, would be reduced if the maximum melting point exceeds 125° C. or if the ratio of the quantity of heat of crystal fusion at the maximum melting point is too large. Moreover, there is found any description neither on hot tack nor on utility as composite films. Such an ethylene copolymer is unsatisfactory in film properties, such as low-temperature heat-sealability and hot tack, as shown in the Comparative Examples of the present specification hereinafter given.

Composition distribution is also changeable by uniformly mixing with an ethylene copolymer having a different comonomer content, inclusive of an ethylene homopolymer. In particular, an arbitrary composition distribution could be obtained, in principle, by mixing two or more uniform copolymers.

JP-B-57-37616 discloses a packaging polyolefin film comprising from 50 to 95 parts by weight, preferably from 70 to 90 parts by weight, of high-density polyethylene having a density of from 0.94 to 0.97 g/cm³ and from 5 to 50 parts by weight, preferably from 10 to 30 parts by weight, of a specific ethylene-1-butene random copolymer having a density of from 0.86 to 0.91 g/cm², preferably from 0.88 to 0.90 g/cm³, which is obtained by copolymerization in the presence of a vanadium catalyst. The film disclosed, however, has considerably higher nerve (rigidity) as compared with a film comprising B-LDPE and therefore cannot be referred to as a low-density polyethylene film. The reference also refers to a film obtained from a mixture containing an ethylene-1-butene random copolymer (density: 0.889 g/cm³) in a proportion higher than the above-specified range so as to exhibit rigidity equal to a B-LDPE film, but such a film suffers from blocking to an unmeasurable extent. It gives no specific description concerning heat-sealing properties, neither does it on hot tack.

In order to meet the recently increasing demand for rapid packaging, packaging films are essentially required to have excellent heat-sealing properties, and particularly hot tack. They are additionally required to have transparency and gloss for increasing display effects and high impact strength and tearing strength in any direction for protection of the content, a primary function for use as packaging material as stated above. However, none of the state-of-the-art low-density polyethylene films satisfies these physical properties inclusively.

SUMMARY OF THE INVENTION

One object of this invention is to provide a low-density polyethylene film which highly satisfies all the above-described physical requirements and is suitable for use as packaging film.

Another object of this invention is to provide a material from which the above-described low-density polyethylene film is produced.

The inventors extensively studied low-density polyethylene for use as packaging film and the mechanism of manifestation of heat-sealing properties, and particularly hot tack, that are of significance for the use. A heat sealing process comprises a heating step in which the temperature of a film is elevated by the heat from heat-sealing jaws previously heated to a prescribed temperature and a cooling step in which the sealed surface is relieved from the heat-sealing jaws and allowed to cool. The study has thus been centered on the relation between heat transfer behavior and heat-sealing properties and hot tack in low-density polyethylene. As a result, it has now been found that low-density polyethylene should exhibit a specific heat transfer behavior before highly excellent heat-sealing characteristics can be obtained. It has further been found unexpectedly that low-density polyethylene showing such a specific heat transfer behavior also satisfies other properties demanded for packaging films, such as transparency, gloss, nerve (rigidity), impact strength, and directionality of tearing strength.

That is, the present invention relates to an ethylene-α-olefin copolymer comprising ethylene and an α-olefin having from 3 to 10 carbon atoms, the copolymer having an α-olefin content of from 1.0 to 8.0 mol %, a density of from 0.900 to 0.930 g/cm³, and a melt flow rate (MFR) of from 0.1 to 100 g/10 min., the programed-temperature thermogram of said copolymer as determined with a differential scanning calorimeter (DSC) after being completely melted and then gradually cooled showing an endothermic peak (a) in a range of from 75° to 100° C. and an endothermic peak (b) in a range of from 120° to 140° C., with the ratio of an endotherm ($\Delta Hb$) at the endothermic peak (b) to an endotherm ($\Delta Hb$) at the endothermic peak (a), i.e., $\Delta Hb/\Delta Ha$, being from 0.03 to 2.0.

The present invention also relates to a film comprising the above-stated ethylene-α-olefin copolymer and a composite film containing said film on at least one side thereof.

The present invention further relates to a low-density polyethylene film whose programed-temperature thermogram as determined directly for the film state with a DSC shows an endothermic peak (a) in a range of from 75° to 100° C. and an endothermic peak (b) in a range of from 120° to 140° C., with the ΔHb/ΔHa ratio being from 0.03 to 2.0.

The present invention furthermore relates to a composite film containing the above-described low-density polyethylene film on at least one side thereof.

The present invention furthermost relates to a polyethylene mixture having a density of from 0.900 to 0.930 g/cm$^3$ and an MFR of from 0.1 to 100 g/10 min., which comprises (I) from 60 to 99 parts by weight of an ethylene-α-olefin random copolymer comprising ethylene and an α-olefin having from 3 to 10 carbon atoms, the copolymer having an o-olefin content of from 2.0 to 10 mol% and a density of from 0.895 to 0.915 g/cm$^3$, the programed-temperature thermogram of said copolymer as determined with a DSC after being completely melted and then gradually cooled showing an endothermic peak in a range of from 75° to 100° C., with the ratio of an endotherm at said peak to the total endotherm being at least 0.8, and (II) from 1 to 40 parts by weight of high-density polyethylene having a density of at least 0.945 g/cm$^3$, the programed-temperature thermogram of said high-density polyethylene as determined with a DSC after being completely melted and allowed to cool showing an endothermic peak at 125° C. or higher [the sum of (I) and (II) amounts to 100 parts by weight].

The present invention additionally relates to a film comprising the above-described polyethylene mixture and a composite film containing said polyethylene mixture film on at least one side thereof.

BRIEF DESCRIPTION OF THE DRAWINGS

In FIGS. 1 and 2, the straight line nearly parallel to the abscissa (temperature) indicates a base line, and the line perpendicular to the abscissa indicates the temperature at which the thermogram reveals the minimum between endothermic peaks. An endotherm in each peak area is calculated by drawing a boundary at this point.

DETAILED DESCRIPTION OF THE INVENTION

Figure 1:
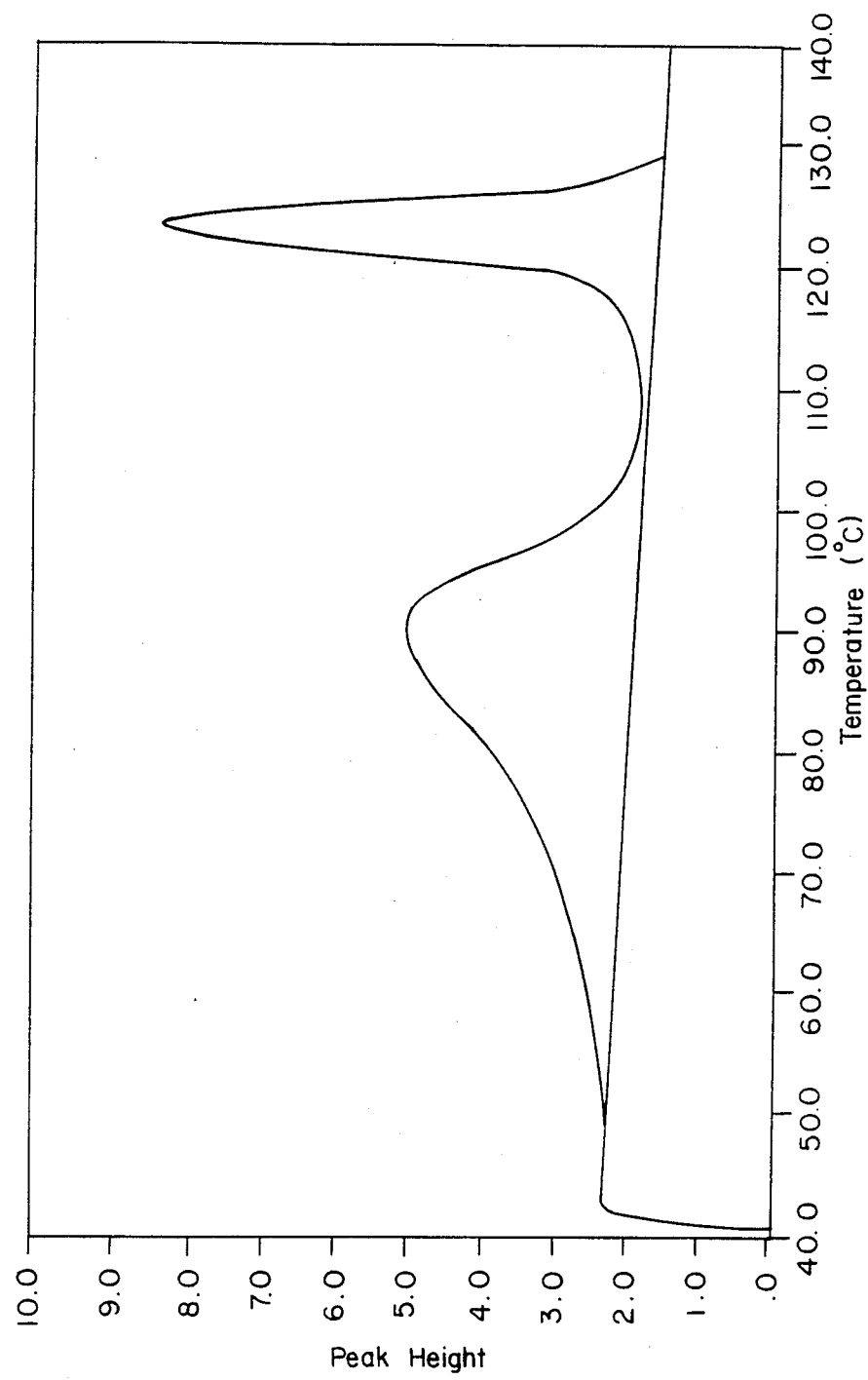
FIG. 1 is a programed-temperature thermogram of Example 2, which was determined after temperature reduction at a rate of 1° C./min followed by temperature rise at a rate of 10° C./min.

As stated above, linear low-density polyethylene having a uniform or nearly uniform composition with a narrow composition distribution has been believed to provide a film excellent in transparency, impact strength, and low-temperature heat-sealing properties. In cases where the low-density polyethylene has plural melting points in thermal analysis with a DSC, it has been considered favorable to film properties that the maximum melting point should not be too high and the amount of heat of crystal fusion at the maximum melting point should be small. Unlike these received knowledges, the ethylene-α-olefin copolymer according to the present invention has a non-uniform composition distribution, and its maximum melting point is preferably as high as possible within a range permissible as polyethylene. As compared with the films obtained from the linear polyethylene based on the conventional concept, the film according to the present invention is characterized by strong nerve (high rigidity), excellent transparency and gloss, high impact strength, high tearing strength in both machine and cross directions, low heat-sealing temperature, and hot tack at low temperatures in a broad range. That is, the film of the invention is superior in all of the properties important as packaging film.

The ethylene-α-olefin copolymer which can be used in the present invention has a density of from 0.900 to 0.930 g/m$^3$, preferably from 0.905 to 0.925 g/cm$^3$, as measured after annealing at 100° C. for 1 hour in accordance with JIS K6760. While the film of the present invention exhibits strong nerve (i.e., high modulus) for the density of the ethylene-α-olefin copolymer used as a material, a density lower than the above-recited range results in production of a film of weak nerve, which tends to suffer from wrinkling on lamination. On the other hand, if the density is higher than that, the temperature at which heat-sealability or hot tack is manifested becomes too high to realize speeding up of packaging and filling.

The ethylene-α-olefin copolymer has an MFR of from 0.1 to 100 g/10 min. as measured according to JIS K6760. A preferred MFR varies depending on the process for producing films. For example, a preferred MFR is from 0.1 to 10 g/10 min., more preferably from 0.2 to 5 g/10 min., in the case of blown-film extrusion; from 0.5 to 50 g/10 min., more preferably from 1 to 10 g/10 min., in the case of T-die extrusion; or from 1 to 100 g/10 min., more preferably from 2 to 50 g/10 min., in the case of extrusion lamination. In general, according as an MFR decreases, the strength of the resulting film becomes higher but, in turn, the load of extrusion of film molding increases. According as an MFR increases, the film strength is reduced but it becomes easier to obtain a film of small thickness at a high speed.

The α-olefin to be copolymerized with ethylene contains from 3 to 10 carbon atoms as represented by formula:

wherein R represents an alkyl group having from 1 to 8 carbon atoms.

Specific examples of the α-olefin include propylene, butene-1, pentene-1, hexene-1, heptene-1, octene-1, nonene-1, decene-1, 4-methylpentene-1, 4-methylhexene-1, and 4,4-dimethylpentene-1. Of these α-olefins, propylene produces relatively small improving effects, and those having 4 or more carbon atoms are preferred. In particular, butene-1, pentene-1, hexene-1, octene-1, and 4-methylpentene-1 are more preferred in view of availability and quality of the resulting copolymers. If desired, these α-olefins may be used in combination of two or more thereof.

The most important factor in the present invention is a thermal transition behavior as hereinafter described. AS is commonly accepted, a thermal transition behavior of a polymer can be determined with a DSC. A diagram of exothermic or endothermic reaction rate vs. temperature, called a thermogram, reflects a distribution of lamella thickness of the polymer. The lamella thickness distribution is known to be influenced by the composition distribution and thermal history of the polymer as described, e.g., in S. Hosoda, *Polymer J.*, Vol. 20, p. 383 (1988).

Determination of thermal transition behavior as referred to in the present invention is divided into two cases, one for obtaining information regarding composition distribution of a polymer per se, and the other for obtaining information regarding lamella thickness distribution of a film obtained from the polymer.

In the former case, a programed-temperature thermogram is determined after a polymer is completely melted and then gradually cooled. Since the thermal transition behavior of polymers changes according to their thermal history, the determination should be done after removing the influences of the thermal history. As shown in the accompanying drawings and Reference Example hereinafter described, if the rate of cooling is not sufficiently low, a seeming splitting of the peak may sometimes be found in the subsequent temperature rise. This is probably because lamellar crystals which have not been allowed to sufficiently grow under rapid cooling undergo fusion-recrystallization during the temperature rise. Hence, in the present invention, a sample is kept in a DSC at 150° C. for 5 minutes (premelting) and then cooled to 40° C. at a rate of 1° C./min to obtain a thermogram under temperature drop and, thereafter, the sample is heated up to 150° C. at a rate of 10° C./min to obtain a thermogram under temperature rise. In each thermogram obtained, a straight line is drawn between the point at which heat generation initiates and the point of 50° C. or between the point of 50° C. and the point at which the endothermic reaction comes to the end. This line is a base line for calculating amounts of heat. The terminology "peak" as used herein means one revealing a clear maximum in endothermic side excluding a shoulder merely discernible by an inflection point or a mountain looking like a peak due to a small change of less than 1/10 the maximum peak intensity. In other words, minute changes of a thermogram are of no concern of the present invention.

What is important for the ethylene-α-olefin copolymer of the present invention is that its programed-temperature thermogram reveals an endothermic peak (a) in a temperature range of from 75° to 100° C., preferably from 80° to 95° C. The thermogram may have plural endothermic peaks (a) within the above-recited temperature range. If the peak temperature of the endothermic peak (a) is higher than 100° C., the resulting film fails to exhibit heat-sealability and hot tack from a sufficiently low temperature. If it is lower than 75° C., the resulting film has reduced heat-sealing properties or a reduced maximum peel strength while hot-tack.

It is also necessary that the programed-temperature thermogram should also have an endothermic peak (b) at 120° C. or higher. If there is only the endothermic peak (a), the temperature at which hot tack and heat-sealability can be manifested is not sufficiently lowered. Besides, the temperature range in which hot tack is exhibited is extremely narrow, making the film virtually useless.

In order to enjoy heat-sealability and hot tack from a sufficiently low temperature, a ratio of an endotherm (ΔHb) at the peak (b) to an endotherm (ΔHa) at the peak (a), i.e., a ΔHb/ΔHa ratio, should be at least 0.03, preferably 0.05 or more, more preferably 0.10 or more. On the other hand, if the ΔHb/ΔHa ratio is larger than 2.0, the temperature at which hot tack and heat-sealability are exhibited becomes unfavorably high. Accordingly, the ΔHb/ΔHa ratio should not exceed 2.0, preferably not exceed 1.5, more preferably not exceed 1.0. If the temperature at the endothermic peak (b) is lower than 120° C., the temperature range for manifestation of hot tack becomes narrow. A preferred endothermic peak (b) is present at 122° C. or higher. From the fact that the melting point of polyethylene does not exceed 140° C., the peak temperature of the endothermic peak (b) is not higher than 140° C. Plural endothermic peaks (b) may be present within the above-recited temperature range.

The endotherm ΔHa is a quantity of heat of absorption in the peak area between temperatures at each of which the thermogram falls to the minimum (the endothermic side being taken as positive) between endothermic peaks each observed in the higher or lower temperature side than the range in which the endothermic peak (a) should be present. In case where no endothermic peak is observed in the lower temperature side, the level at 50° C. is used as a boundary. The endotherm ΔHb is a quantity of heat of absorption in the peak area between a temperature at which the thermogram falls to the minimum between the endothermic peak (b) and an endothermic peak observed in the lower temperature side than the range in which the endothermic peak (b) should be present and a temperature at which endothermic reaction comes to an end. In case where a given minimum level is maintained over a certain temperature range, the central temperature in that range is taken as a boundary.

Although the programed-temperature thermogram of the ethylene-α-olefin copolymer according to the present invention may have endothermic peaks other than the above-described peaks (a) and (b), it is preferable for obtaining the full effects of the present invention that the ratio of the sum of ΔHa and ΔHb to the total endotherm ΔHt, i.e., (ΔHa+ΔHb)/ΔHt, is at least 0.7, more preferably at least 0.8, most preferably at least 0.9.

The endothermic peak (a) preferably has a half width ($Wa_{\frac{1}{2}}$) of not more than 30° C., more preferably not more than 27° C., most preferably not more than 25° C. $Wa_{178}$ is a temperature difference between two intersections of (i) the line extending from the middle point of a perpendicular drawn from the peak (a) down to the base line in parallel to the base line and (ii) the thermogram. In cases where the line (i) intersects the borderline from the neighboring peak before intersecting the thermogram, $Wa_{178}$ is a temperature difference between the temperature at this intersection and the other intersection. If $Wa_{178}$ exceeds 30° C., the heat-sealing strength or peel length while hot-tack in a low temperature side becomes unfavorably high.

When the thermal transition behavior is determined for obtaining information about lamella thickness distribution of a film obtained from the low-density polyethylene, a programed-temperature thermogram is obtained using the polyethylene in the form of a film.

The crystal fusion behavior of a molded article is decided not only by a composition distribution of the starting polymer per se but by thermal history of the molded article during or after processing. Therefore, when it is intended to know the heat fusion behavior of the film of itself, it is necessary to determine the thermogram without subjecting the film to any thermal treatment prior to the determination. In the present invention, accordingly, the film is placed in a DSC measuring pan and heated from 40° C. to 150° C. at a rate of 10° C. per minute to obtain a programed-temperature thermogram. The resulting thermogram is analyzed for temperature, quantity of heat, and half width of the fusion peaks in the same manner as described above. In this case, however, since the lamella thickness distribution assigned to the thermal history carries weight, any change of 5% or more of the maximum peak intensity of the thermogram is regarded as a peak.

Films obtained from the conventional L-LDPE by the molding methods hereinafter described have a programed-temperature thermogram showing an essentially single broad endothermic peak, whereas the films of the present invention are characterized by their programed-temperature thermogram showing plural clear endothermic peaks as illustrated below.

The programed-temperature thermogram of the polyethylene film according to the present invention is required to have an endothermic peak (a) in a range of from 75° to 100° C., preferably from 80° to 95° C. The thermogram may have two or more endothermic peaks (a) within the above-specified range. If the near temperature of the endothermic peak (a) is higher than 100° C., sufficient heat-sealability and hot tack cannot be exerted from a low temperature.

The programed-temperature thermogram of the polyethylene film should also have an endothermic peak (b) in a temperature range of 120° C. or higher. If there in only the endothermic peak (a), the temperature at which hot tack and heat-sealability can be manifested is not sufficiently lowered and, in addition, the temperature range in which hot tack is exhibited is extremely narrow, making the film virtually useless.

In order to enjoy heat-sealability and hot tack from a sufficiently low temperature, a ratio of an endotherm ($\Delta Hb$) at the peak (b) to an endotherm ($\Delta Ha$) at the peak (a), i.e., a $\Delta Hb/\Delta Ha$ ratio, should be at least 0.03, preferably 0.05 or more, more preferably 0.10 or more. On the other hand, if the $\Delta Hb/\Delta Ha$ ratio is larger than 2.0, the temperature at which hot tack and heat-sealability are exhibited becomes unfavorably high. Accordingly, the $\Delta Hb/\Delta Ha$ ratio should not exceed 2.0, preferably not exceed 1.5, more preferably not exceed 1.0. If the temperature at the endothermic peak (b) is lower than 120° C., the temperature range for manifestation of hot tack becomes narrow. A preferred endothermic peak (b) is present at 122° C. or higher. From the fact that the melting point of polyethylene does not exceed 140° C., the peak temperature of the endothermic peak (b) is not higher than 140° C. Plural endothermic peaks (b) may be present within the above-recited temperature range.

Although the programed-temperature thermogram of the polyethylene film may have endothermic peaks other than the above-described peaks (a) and (b), it is preferable for obtaining the full effects of the present invention that the ratio of the sum of $\Delta Ha$ and $\Delta Hb$ to the total endotherm $\Delta Ht$, i.e., $(\Delta Ha + \Delta Hb)/\Delta Ht$, is at least 0.6, more preferably at least 0.7, most preferably at least 0.75.

The endothermic peak (a) of the polyethylene film preferably has a half width ($Wa_{178}$) of not more than 27° C., more preferably not more than 25° C., most preferably not more than 23° C. $Wa_{178}$ is a temperature difference between two intersections of (i) the line extending from the middle point of a perpendicular drawn from the peak (a) down to the base line in parallel to the base line and (ii) the thermogram. In cases where the line (i) intersects the borderline from the neighboring peak before intersecting the thermogram, $Wa_{178}$ is a temperature difference between the temperature at this intersection and the other intersection. If $Wa_{178}$ exceeds 27° C., the heat-sealing strength or peel length while hot-tack in a low temperature side becomes unfavorably high.

The ethylene-α-olefin copolymer according to the present invention can be synthesized by copolymerizing ethylene and an α-olefin having from 3 to 10 carbon atoms in a polymerization vessel. In one example of the synthesis, the ethylene-α-olefin copolymer of the present invention can be obtained by polymerizing ethylene in the presence of a catalyst composed of (a) a transition metal component and (b) an organometallic compound and then feeding an α-olefin and (c) a third component to the polymerization system. The density and α-olefin content of the ethylene-α-olefin copolymer can be controlled by adjusting the amounts of the α-olefin and the third component (c) to be fed. Since these amounts depend on the kinds of the components (a), (b), and (c), the polymerization temperature, and the polymerization pressure, they should be experimentally determined as specifically shown in the Examples hereinafter described.

The polyethylene mixture according to the present invention can be obtained by mixing (I) from 60 to 99 parts by weight of a random copolymer comprising ethylene and an α-olefin having from 3 to 10 carbon atoms and having a density of from 0.895 to 0.915 g/cm$^3$, preferably from 0.900 to 0.910 g/cm$^3$, and an α-olefin content of from 2.0 to 10.0 mol %, the DSC programed-temperature thermogram of which reveals an endothermic peak in a range of from 75° to 100 ° C., preferably from 80° to 95° C., with the ratio of an endotherm at the peak to the total endotherm being at least 0.8, and (II) from 1 to 40 parts by weight of high-density polyethylene having a density of at least 0.945 g/cm$^3$, the DSC programed-temperature thermogram of which reveals an endothermic peak at 125° C. or higher, preferably 130° C. or higher, wherein the sum of the copolymer (I) and the high-density polyethylene (II) amounts to 100 parts by weight.

The copolymer (I) can be obtained by the process disclosed in Japanese Patent Application No. 63-142522 applied by Sumitomo Chemical Co., Ltd. More specifically, the process comprises copolymerizing ethylene and an α-olefin having from 3 to 10 carbon atoms in a hydrocarbon solvent in the presence of a catalyst system composed of (a) a vanadium compound represented by formula:

$$VO(OR)_nX_{3-n}$$

wherein R represents a hydrocarbon group; X represents a halogen atom; and $0 < n < 3$, as a transition metal component, (b) an organoaluminum compound represented by formula:

$$R'_mAlX_{3-m}$$

wherein R' represents a hydrocarbon group; X represents a halogen atom; and $1 < m < 3$, as an organometallic component, and (c) an ester compound (hereinafter referred to as M) represented by formula:

$$R''(C=O)OR'''$$

wherein R'' represents an organic group having from 1 to 20 carbon atoms whose hydrogen atoms are partly or totally substituted with a halogen atom; and R''' represents a hydrocarbon group having from 1 to 20 carbon atoms, at an Al/V molar ratio of at least 2.5 and an M/V molar ratio of at least 1.5, at an ethylene/α-olefin molar ratio of from 35/65 to 60/40 at a polymerization temperature of from 40° to 80° C. in such a system wherein a hydrocarbon solvent-insoluble polymer (slurry phase) and a hydrocarbon solvent-soluble polymer (solution phase) coexist.

The copolymer (I) can also be obtained by the process disclosed in JP-A-60-226514, in which copolymerization is carried out in the same manner as described above, except for using a vanadium compound prepared by reacting vanadium trichloride and an alcohol as the transition metal component (a). The copolymer (I) may also be obtained by the process described in JP-B-46-21212.

The α-olefin to be used preferably contains from 4 to 10 carbon atoms. In using α-olefins having 6 or more carbon atoms, the polymerization is preferably effected by using the above-described vanadium compound according to JP-A-60-226514.

The high-density polyethylene (II) is an ethylene homopolymer and/or a copolymer of ethylene and an o-olefin having from 3 to 10 carbon atoms and is selected from those commercially available as high-density polyethylene.

The MFR of each of the copolymer (I) and the high-density polyethylene (II) is arbitrarily selected from a range of from 0.01 to 1000 g/10 min. as far as the MFR of the mixture thereof falls within a rang of from 0.1 to 100 g/10 min. In selecting the MFR, the fact that MFR logarithms substantially have an additive property can be made a guide.

A weight mixing ratio of the copolymer (I) to the high-density polyethylene (II) preferably ranges from 98/2 to 70/30, more preferably from 97/3 to 80/20.

The copolymer (I) and the high-density polyethylene (II) are blended at temperatures above the point at which both of them are fused to obtain a uniform mixture. Blending can be carried out with any of known kneading machines, either batch or continuous types or single- or multi-screw types, as well as an extruder of a film producing apparatus.

The polyethylene film according to the present invention can be produced from the above-described ethylene-α-olefin copolymer or polyethylene mixture at a temperature of fusing the resins by known techniques, such as inflation, T-die extrusion, etc.

The inflation is called blown-film extrusion and comprises extruding a molten resin from an extruder through a circular slit of a ring die and blowing a gas (usually air) into the inside of the extruded tubular film at a controlled blow pressure to obtain a film having a broad range of width. The ratio of the diameter of the blown tubular film to the diameter of the circular slit is called a blow-up ratio (BUR). The film thickness can be adjusted by selecting the extrusion rate and BUR. The extruded and blown tubular film is cooled with a gas (usually air) and/or a liquid (usually water) from the outside. The technique including cooling with water, called water-cooling inflation, is useful for producing films having excellent transparency but a thickness alteration is troublesome to make. On the other hand, various devices and methods for cooling in the technique including cooling with air, called air-cooling inflation have been proposed. The air-cooling inflation is divided into a single-stage air-cooling system and a multi-stage air-cooling system. Since conventional films produced by single-stage air-cooling inflation of L-LDPE exhibit insufficient transparency, the multi-stage air-cooling system was proposed to solve this problem. The latter system, however, involves difficulty in altering a film thickness similarly to the water-cooling inflation technique and hence loses the merit of inflation that a plural kind of films can be produced in the same machine.

The ethylene-α-olefin copolymer or polyethylene mixture according to the present invention provides films having very excellent transparency even by the single-stage air-cooling inflation. It is a matter of course that films excellent in transparency can also be obtained by water-cooling inflation or multi-stage air-cooling inflation as well. The resin temperature on film extrusion is usually selected from the range of from a complete fusion temperature to 250° C.

T-die extrusion is called a cast film process, in which a resin kneaded and melted in an extruder is extruded through a parallel slit of a lot die and cooled on contact with a chill roll through which a cooling medium such as water is circulated to obtain films generally excellent in transparency and thickness accuracy. The thickness of the case film can be adjusted by selecting a rate of extrusion and a take-off speed. The resin temperature on casting is usually selected from the range of from a complete fusion temperature to 350° C.

A single-layer film comprising the low-density polyethylene of the present invention usually has a thickness of from 5 to 500 μm, preferably from 10 to 100 μm. If the film thickness is less than 5 μm, processing becomes difficult and also handling of the film on lamination becomes difficult. If the thickness is too large, not only processing becomes difficult but heat-sealing properties are hardly manifested.

For making the full advantage of the superior heat-sealing properties of the film according to the present invention, it is desirable that the low-density polyethylene film of the invention be combined with other bases in the form of a composite film, in which the low-density polyethylene film preferably constitutes a surface layer on at least one side thereof.

The bases to be combined can be selected arbitrarily from among film-forming polymers, cellophane, paper, paperboard, fabric, an aluminum foil, and the like. The film-forming polymers include polyamide resins, e.g., nylon 6, nylon 66, nylon 11, and nylon 12; polyester resins, e.g., polyethylene terephthalate and polybutylene terephthalate; polyolefin resins, e.g., polypropylene, poly-1-butene, poly-4-methyl-1-pentene, polyethylene, an ethylene-vinyl acetate copolymer, an ethylene-methacrylate copolymer, an ethylene-acrylate copolymer, an ethylene-methacrylic acid copolymer, and ionomers; polyvinylidene chloride; polyvinyl chloride; polystyrene; polyvinyl alcohol; an ethylene-vinyl alcohol copolymer; etc. These film-forming polymers can be chosen according to the end use of a composite film taking into consideration gas barrier properties, printability, transparency, rigidity, adhesion, or the like factor. In cases of using stretchable bases, particularly those which are stretched to provide improved film characteristics, such as polyamide resins, polyester resins, and polypropylene, the base may be uniaxially or biaxially stretched, if desired.

In composite films, the low-density polyethylene film layer of the present invention usually has a thickness of from 1 to 500 $\mu$m, preferably from 10 to 100 $\mu$m. The thickness of the base is arbitrary and can be decided depending on the end use. It is widespread to produce a composite film containing plural bases in various layer structures, and such a technique is applicable to the present invention.

The composite films composed of two or more layers can be produced by known processes, such as lamination processes including dry lamination, wet lamination, sandwich lamination, and hot-melt lamination; co-extrusion, extrusion coating (called extrusion lamination), and a combination thereof.

According to the lamination process, the film of the present invention obtained by the above-described process or the composite film herein described is laminated with other base using a solvent type adhesive, an aqueous adhesive, a hot-melt adhesive, a molten polymer, etc. In the co-extrusion process, the low-density polyethylene of the present invention and other polymer are separately melted and extruded and brought into contact with each other in the inside and/or outside of an extrusion die. In the extrusion coating process, the low-density polyethylene film of the present invention or a molten polymer film obtained by the above-described co-extrusion is coated on at least one side of a base or the composite film herein described. For the detailed information about these processes, reference can be made to it in *Laminate Kako Binran*, published by Kako Gijutsu Kenkyukai.

Of the thus produced composite films, those having a uniaxially or biaxially stretchable base may be subjected to uniaxial or biaxial stretching. Stretching would provide a stretched composite film having its low-density polyethylene layer reduced to a thickness of about 1 $\mu$m. The stretching of the composite film can be carried out under heating to a temperature at which the base used can be stretched by any known technique, such as tentering, inflation, and rolling. If desired, the stretched composite film may be subjected to heat setting.

If desired, the film or mixture according to the present invention can contain various known additives such as antioxidants, weathering agents, lubricants, anti-block agents, antistatic agents, anti-fogging agents, anti-water drop agents, pigments, and fillers.

The film according to the present invention exhibits excellency in all the properties required for use as packaging film. That is, it has strong nerve (high rigidity), excellent transparency and gloss, high impact strength, and well-balanced tearing strength in the machine and cross directions and exhibits heat-sealability at low temperatures and hot tack at low temperatures of a broad range. Therefore, the film, either in the form of a single-layer film or a composite film, can be used for packaging a wide variety of contents, such as foods to be packed together with water; liquid foods, e.g., milk and soups; dry foods, e.g., confectionary; processed meat products, e.g., ham and sausage; and so on.

The present invention is now illustrated in greater detail by way of the following Examples, Comparative Examples, and Reference Example, but it should be understood that the present invention is not deemed to be limited thereto.

In these example, physical properties were measured by evaluated according to the following methods.

(1) Density

Measured in accordance with JIS K6760. The measurement was conducted after subjecting a sample to annealing in water at 100° C. for 1 hour.

(2) MFR

Measured in accordance with JIS K6760.

(3) DSC Thermogram

Determined with a differential scanning calorimeter, DSC-7 manufactured by Perkin-Elmer Corporation.

(i) Determination of programed-temperature thermogram after complete fusion followed by gradual cooling A specimen weighing about 10 mg cut out of an about 0.5 mm thick pressed sheet is put in a sample pan of a DSC, premelted at 150° C. for 5 minutes, cooled to 40° C. at a rate of 1° C./min, and kept at that temperature for 5 minutes. Thereafter, the specimen is heated up to 150° C. at a rate of 10° C./min to obtain a thermogram.

(ii) Determination of programed-temperature thermogram directly for film

Several laid-up films totally weighing about 10 mg are put in a sample pan of a DSC and kept at 40° C. for 5 minutes. Thereafter, the films are heated up to 150° C. at a rate of 10° C./min to obtain a thermogram.

(4) Haze (Degree of Cloudiness)

Measured in accordance with ASTM D1003. The smaller the measured value, the higher the transparency.

(5) Gloss

Measured in accordance with JIS Z8741. The greater the value obtained, the higher the gloss.

(6) Secant Modulus at 1% Strain

A 2 cm wide specimen cut out of a film in the machine direction (MD) or the cross direction (CD) is fixed to a tensile tester at a chuck distance of 6 cm and pulled at a speed of 5 mm/min. The secant modulus can be calculated by inserting a stress at 1% elongation into formula [100×(stress)/(cross sectional area)].

(7) Dart Drop Impact Strength

Measured according to ASTM D1709, Method A.

(8) Elmendorf Tear Strength

Measured according to JIS Z1702.

(9) Heat-Sealing Properties

Two composite films are contacted in such a manner that the polyethylene layers face to each other and heat sealed to a width of 10 mm by means of a heat sealer manufactured by Tester Sangyo K.K. under a jaw pressure of 1.0 kg/cm² for a heat-sealing time of 1.0 second, with a heat-sealing temperature being varied from 85° C. to 150° C. by 5° C. The sealed film is cut to a width of 15 mm in the direction at right angles to the sealed area and a peel strength of the sealed area is measured with a Schopper tensile tester at a peel angle of 180° and at a pulling speed of 200 mm/min.

(10) Hot Tack

Two 15 mm-wide composite films are contacted in such a manner that the polyethylene layers face to each other, and a load of 30 g is applied on one of the films via a pulley. The films are heat sealed to a width of 20 mm by means of a heat sealer manufactured by Tester Sangyo K.K. at a jaw pressure of 1.3 kg/cm² for a sealing time of 0.3 second with a jaw temperature (heat sealing temperature) being varied from 100° C. to 170° C. by 5° C. In the instant of completion of heat sealing, the load is dropped thereby applying a peel force due to the load on the sealed surface in 0.14 second from the completion of heat sealing. The length actually peeled apart (peel length) is measured.

In the following description, all the parts and percents are given by weight unless otherwise indicated.

EXAMPLES 1 TO 11 AND COMPARATIVE EXAMPLES 1, 2, 5 AND 7

(1) Preparation of Copolymer (I)

To the lower part of a 200 l-volume jacketed reaction vessel equipped with a stirrer were continuously fed a solution of ethylene in n-hexane and a solution of butene-1 in n-hexane at a total n-hexane feed rate of 80 kg/hr with the feed rates of ethylene and 1-butene being changed as shown in Table 1. Each of vanadyl trichloride, ethylaluminum sesquichloride, and n-butyl perchlorocrotonate was continuously fed to the vessel through the respective line at the respective feed rates as shown in Table 1. The inner temperature of the reaction vessel was controlled at 40° C. or 50° C. by circulating cooling water through the jacket. During the polymerization, the polymerization liquid was continuously withdrawn from the upper part of the vessel so as to maintain the vessel always in a state filled with the liquid to the limit. The polymerization reaction was ceased by addition of a small amount of methanol. After removing any residual monomers from the reaction mixture and washing the mixture with water, the solvent was removed by stripping to collect a solid copolymer produced, which was then dried at 80° C. under reduced pressure to obtain an ethylene-1-butene copolymer. The thus obtained copolymers were designated as I-A to I-E.

The polymerization conditions, the production rate of the copolymer, the density and MFR of the resulting copolymer, and the endothermic peak temperature (DSC melting point) in the DSC thermogram of the copolymer as determined after complete fusion and gradual cooling are shown in Table 1.

(2) Mixing of Copolymer (I) and High-Density Polyethylene

Each of Copolymers I-A to I-E as obtained in (1) above was blended with Nissan Polyethylene® 1010 (hereinafter referred to as II-A), 2010 (hereinafter referred to as II-B) or 1070 (hereinafter referred to as II-C) at a mixing ratio shown in Table 3 or 4 by means of an intensive mixer, #0 Model manufactured by Nippon Roll Seizo K.K., at a revolution of 35 rpm and at a temperature of 150° C. for 10 minutes. At the time of blending, 0.20 part of calcium stearate, 0.15 part of Irganox® 1076, 0.10 part of Sandostab®P-EPQ, 0.08 part of erucamide, and 0.10 part (Examples 1 to 3 and Comparative Examples 1 and 2) or 0.40 part (Examples 4 to 11 and Comparative Examples 5 and 7) of a silica type anti-block agent were added to the mixture, each per 100 parts of the total resin content.

The Nissan Polyethylene® series used as high-density polyethylene are ethylene-1-butene copolymers as proved by infrared analysis. The density and MFR of these polyethylene resins and the temperature at the endothermic peak in the DSC thermogram of each polyethylene resin as determined after complete fusion and gradual cooling and the half width of said peak are shown in Table 2.

Table 3 and 4 each shows the density and MFR of the resulting uniform mixture and the endothermic peak temperature, the $\Delta Hb/\Delta Ha$ ratio, the $(\Delta Ha + \Delta Hb)/\Delta Ht$ ratio, and the half width $Wa_{178}$ in the DSC thermogram of the mixture as determined after complete fusion and gradual cooling.

(3) Production of Film (i) Inflation (Examples 1 to 10 and Comparative Examples 1, 2, 5 and 7)

A 30 μm thick film was produced from each of the uniform polyethylene mixtures as prepared in (2) above by using an inflation molding machine, K-40R manufactured by Placo Corporation, equipped with a spiral die having a die diameter of 125 mm and a die lip of 2.0 mm and a single-stage air ring having an iris at a rate of extrusion of 24 kg/hr, at a die temperature of 170° C., and at a blow-up ratio of 1.8. Physical properties of each of the resulting films are shown in Tables 3 and 4. The films to be used in composite films are hereinafter described were subjected to corona discharge treatment with a corona discharge treating device so as to give a surface tension of from 42 to 45 dyne/cm.

(ii) T-Die Extrusion (Example 11)

A 30 μm thick film was obtained from each of the uniform polyethylene mixtures as prepared in (2) above by the use of a T-die film molding machine manufactured by Tanabe Plastic K.K. equipped with an extruder having an inner diameter of 50 mm, a T-die having a die width of 400 mm and a gap of 0.7 mm and a semi-matte roll at a resin temperature of 270° C., at a rate of extrusion of 6.4 kg/hr, and at a chill roll temperature of 75° C. the film was subjected to corona discharge treatment by means of a corona discharge treating device so as to give a surface tension of from 42 to 45 dyne/cm. Physical properties of each of the resulting films are shown in Table 4.

(4) Production of Composite Film

(i) Sandwich Lamination (Examples 1 to 3 and Comparative Examples 1 and 2)

A stretched nylon (thickness: 15 μm)/LDPE (thickness: 20 μm) base film and the film obtained in (3) above were laminated while extruding Sumikathene® L705 having a resin temperature of 320° C. therebetween by the use of an extruder (diameter: 65 mm) manufactured by Sumitomo Chip Building and Machinary Co., Ltd. and a laminator, Model 550 manufactured by Tanabe Plastic Kikai K.K., to obtain a composite film having a sandwich structure whose intermediate layer had a thickness of 30 μm. The heat-sealing properties and hot tack of the resulting composite film are shown in Tables 5 and 6, respectively.

(ii) Dry Lamination (Examples 4 and 11 and Comparative Examples 5 and 7)

The film obtained in (3) above was press bonded on a 15 μm thick stretched nylon base film on which a urethane adhesive had been applied to a dry spread of 2 g/m$^2$ at a temperature of 40° C. and at a pressure of 3 kg/cm$^2$ by means of a bench test roller manufactured by Yasui Seiki K.K., and aged under heating at 40° C. for 2 days to obtain a dry lamination composite film. The heat-sealing properties and hot tack of the resulting composite film are shown in Tables 7 and 8, respectively.

COMPARATIVE EXAMPLE 3

A blown film and a composite film were produced in the same manner as in Example 2-(3) and (4), except for replacing the uniform polyethylene mixture as used in Example 2 with polyethylene of a Sumikathene®-L series experimentally prepared by Sumitomo Chemical Co., Ltd. having a density of 0.913 g/cm$^3$ and an MFR of 1.9 (identified as an ethylene-1-butene copolymer by infrared analysis). The DSC thermogram of this copolymer as determined after complete fusion and gradual cooling showed endothermic peaks at 103.0° C. and 120.4° C. and a minimum at 112.0° C. between these endothermic peaks. The ratio of the endotherm in the higher temperature side to the endotherm in the lower temperature side divided on the boundary at 112.0° C. was found to be 0.42, and the half width of the peak in the lower temperature side was found to be 34.2° C. The thermogram obtained by directly heating the film obtained from the copolymer showed a single peak at 116.0° C., with its half width being 29.8° C.

The properties of the resulting film and composite film are shown in Tables 3, 5 and 6.

EXAMPLE 4

A blown film and a composite film were produced in the same manner as in Example 2-(3) and (4), except for replacing the uniform polyethylene mixture as used in Example 2 with Ultzex® 1520L produced by Mitsui Petrochemical Industries, Ltd. (density: 0.913 g/cm$^3$; MFR: 2.5; identified as an ethylene-4-methyl-1-pentene copolymer having a 4-methyl-1-pentene content of 9.1% by infrared absorption analysis). In this case, since the copolymer pellets were found to contain 0.15 part of an anti-block agent per 100 parts of the copolymer, no anti-block agent was externally added. The DSC thermogram of the copolymer as determined after complete fusion and gradual cooling showed endothermic peaks at 102.3° C. and 119.3° C. and a minimum at 115.4° C. between these endothermic peaks. The ratio of the endotherm in the higher temperature side to the endotherm in the lower temperature side divided on the boundary at 115.4° C. was found to be 0.19, and the half width of the peak in the lower temperature side was found to be 31.4° C. The thermogram obtained by directly heating the film obtained from the copolymer showed a broad distribution, revealing a single peak at 109.4° C., with its half width being 27.6° C.

The properties of the resulting film and composite film are shown in Tables 3, 5 and 6.

EXAMPLE 12

(1) Preparation of Polyethylene by Two-Stage Polymerization

In a 100 l-volume jacketed reactor equipped with a stirrer were charged 60 of n-hexane and 60 g of ethylaluminum sesquichloride. The inner temperature of the reactor was elevated to 40° C. by circulating warm water through the jacket. Then, 3.0 kg/cm$^2$ of ethylene was fed, and 4 mg of vanadium trichloride was added to the mixture to initiate polymerization. During the reaction, ethylene was fed so as to maintain the ethylene pressure at 2.6 kg/cm$^2$. Twenty minutes later, 8 kg of 1-butene and 2.5 kg/cm$^2$ of hydrogen were fed, and 40 g of n-butyl perchlorocrotonate was added to the mixture. Four 40 g portions of n-butyl perchlorocrotonate were added thereto at intervals of 20 minutes. During the reaction, ethylene was fed so as to maintain the total pressure in the reactor constant, and cooling water was circulated through the jacket so as to maintain the inner temperature at 40° C. After 2 hours from the polymerization initiation, the gas in the reactor was purged, and the reaction mixture was poured into a large quantity of methanol to obtain a precipitate. The precipitate was filtered, and the filter cake was dried to obtain a polyethylene polymer.

The density and MFR of the resulting polymer, and the results of the DSC thermographic analysis of the polymer are shown in Table 4.

(2) Compounding with Additives

The polyethylene as obtained in (1) above was kneaded in an intensive mixer, Model #0 manufactured by Nippon Roll Seizo K.K., at 35 rpm and at 150° C. for 10 minutes together with 0.20 part of calcium stearate, 0.15 part of Irganox® 1076, 0.10 part of Sandostab® P-EQ, 0.08 part of erucamide, and 0.40 part of a silica type anti-block agent, each per 100 parts of the polyethylene.

(3) Production of Film and Composite Film

A blown film and a composite film were produced in the same manner as in Example 10-(3) and (4), except for using the polyethylene pellets as obtained in (2) above.

The results of the DSC thermographic analysis of the resulting film are shown in Table 4. The physical properties of the resulting film and composite film are shown in Tables 4, 7, and 8.

COMPARATIVE EXAMPLE 6

The procedures of Example 9-(3) and (4) wee repeated, except for replacing the uniform mixture as used in Example 9 with a compounded resin obtained by melt-kneading a polyethylene of a Sumikathene®-L series experimentally prepared by Sumitomo Chemical Co., Ltd. (density: 0.914 g/cm$^3$; MFR: 2.7; identified as an ethylene-1-butene copolymer by infrared absorption analysis) and 0.40 part of a silica type anti-block agent per 100 parts of the copolymer.

The DSC thermogram of the above-described copolymer as determined after complete fusion and gradual cooling revealed endothermic peaks at 101.4° C. and 120.3° C. and the minimum at 111.8° C. between these endothermic peaks. The ratio of the endotherm in the lower temperature side to that in the higher temperature side on the boundary at this temperature of the minimum was 0.33, and the half width of the peak in the lower temperature side was 31.6° C. The DSC thermogram of the film showed a single peak at 109.5° C., the half width of which was 27.8° C.

The properties of the resulting film and composite film are shown in Tables 4, 7, and 8.

EXAMPLE 13 AND COMPARATIVE EXAMPLE 8

(1) Synthesis of Vanadium Catalyst (a)

In a 100 ml-volume flask whose atmosphere had been displaced with argon, 0.033 mol of vanadium trichloride and 26 ml of n-heptane were charged and heated to 60° C. To the mixture was added 0.165 mol of methyl alcohol, and the mixture was allowed to react at 50° C. for 1 hour while stirring in an argon stream. After the reaction, the supernatent liquor was withdrawn through a glass filter, and the solid was washed 3 times with 25 ml portions of n-heptane and dried under reduced pressure to obtain an n-heptane-insoluble vanadium compound as a dark green powder.

Compositional analysis by water-degradation revealed that the resulting vanadium compound comprised 21% of a vanadium atom, 42% of a chlorine atom, and 40% of CH$_3$OH. Accordingly, this compound was identified to be represented by formula VCl$_3$.3.0CH$_3$OH (i.e., the compound of formula V(OR)$_m$Cl$_{3-m}$.nROH, wherein m is 0, and n is 3.0). The powder X-ray diffraction spectrum of the compound showed no spectrum characteristic of vanadium trichloride.

(2) Preparation of Copolymer I-G

In a 100 l-volume jacketed reactor equipped with a stirrer were charged 60 l of n-hexane, 3.8 kg of 1-hexene, and 400 ml of a 10% hexane solution of ethylaluminum sesquichloride. The inner temperature of the reactor was elevated to 30° C. by circulating warm water through the jacket. Then, 1.5 kg/cm$^2$ of hydrogen and 4.5 kg/cm$^2$ of ethylene were fed, and to the mixture was added a mixture comprising 1.58 g of the vanadium catalyst (a) as obtained above and 70 ml of a 10% hexane solution of ethylaluminum sesquichloride to initiate polymerization. Five 1.25 ml portions of a 1 mmol/ml solution of n-butyl perchlorocrotonate at intervals of 20 minutes. During the reaction, ethylene was fed so as to maintain the total pressure in the reactor constant, and cooling water was circulated through the jacket so as to maintain the inner temperature at 30° C. After 2 hours from the polymerization initiation, the gas in the reactor was purged, and the reaction mixture was poured into a large quantity of methanol to obtain a precipitate. The precipitate was filtered, and the filter cake was dried to obtain an ethylene-1-hexene copolymer. The resulting copolymer was designated as I-G.

The density and MFR of the copolymer I-G and the results of the DSC thermographic analysis of I-G are shown in Table 4.

(3) Mixing of Copolymer (I) and High-Density Polyethylene:

Copolymer I-G as obtained in (2) above was mixed with Nissan Polyethylene ® 1010 (II-A) under the same conditions as in Example 9-(2). The MFR of the resulting mixture and the results of the DSC thermogram of the mixture as determined after complete fusion and gradual cooling are shown in Table 4.

(4) Production of Film and Composite Film

A film and a composite film were produced from the polyethylene pellets as obtained in (3) above in the same manner as in Example 10-(3) and (4)

The results of the DSC thermographic analysis of the film are shown in Table 4. The physical properties of the film and composite film are shown in Tables 4, 7, and 8.

COMPARATIVE EXAMPLE 9

The procedure of Example 13-(4) was repeated, except for replacing the uniform mixture as used in Example 13 with a compounded resin obtained by melt-kneading polyethylene of a Sumikathene ® α series experimentally prepared by Sumitomo Chemical Co., Ltd. (density: 0.913 g/cm$^3$; MFR: 2.0; identified as an ethylene-1-hexene copolymer by infrared absorption analysis) and 0.40 part of a silica type anti-block agent per 100 parts of the copolymer.

The DSC thermogram of the above-described copolymer as determined after complete fusion and gradual cooling revealed endothermic peaks at 103.6° C. and 121.0° C. and the minimum at 114.0° C. between these endothermic peaks. The ratio of the endotherm in the lower temperature side to that in the higher temperature side on the boundary at this temperature of the minimum was 0.30, and the half width of the peak in the lower temperature side was 33.4° C. The DSC thermogram of the film showed a single peak at 109.4° C., the half width of which was 29.2° C.

The properties of the resulting film and composite film are shown in Tables 4, 7, and 8.

REFERENCE EXAMPLE

Figure 2:
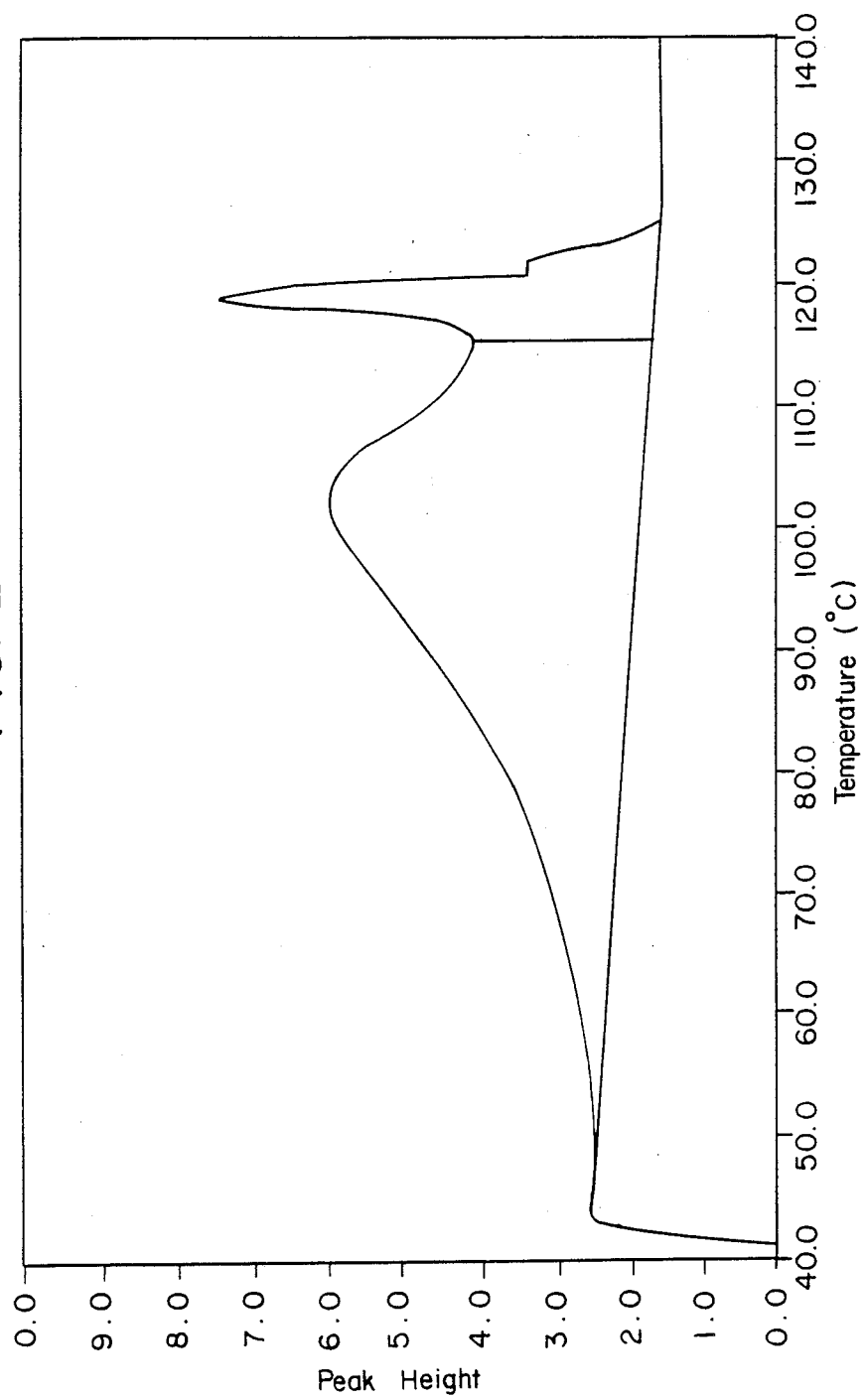
FIG. 2 is a programed-temperature thermogram of Comparative Example 4, which was determined after temperature reduction at a rate of 1° C./min followed by temperature rise at a rate of 10° C./min.
Figure 3:
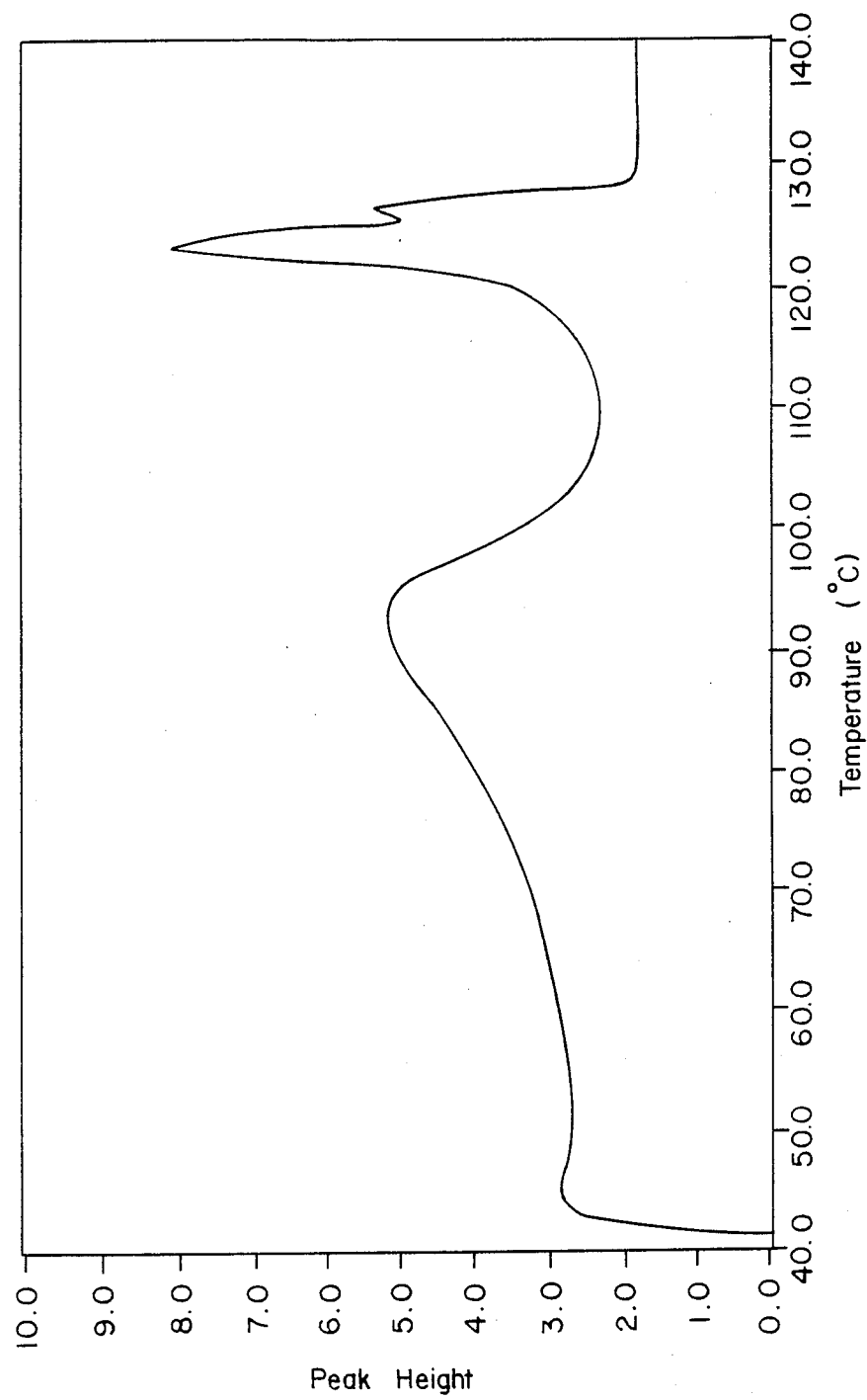
FIG. 3 is a programed-temperature thermogram of Example 2, which was determined after temperature reduction at a rate of 10° C./min followed by temperature rise at a rate of 10° C./min.
Figure 4:
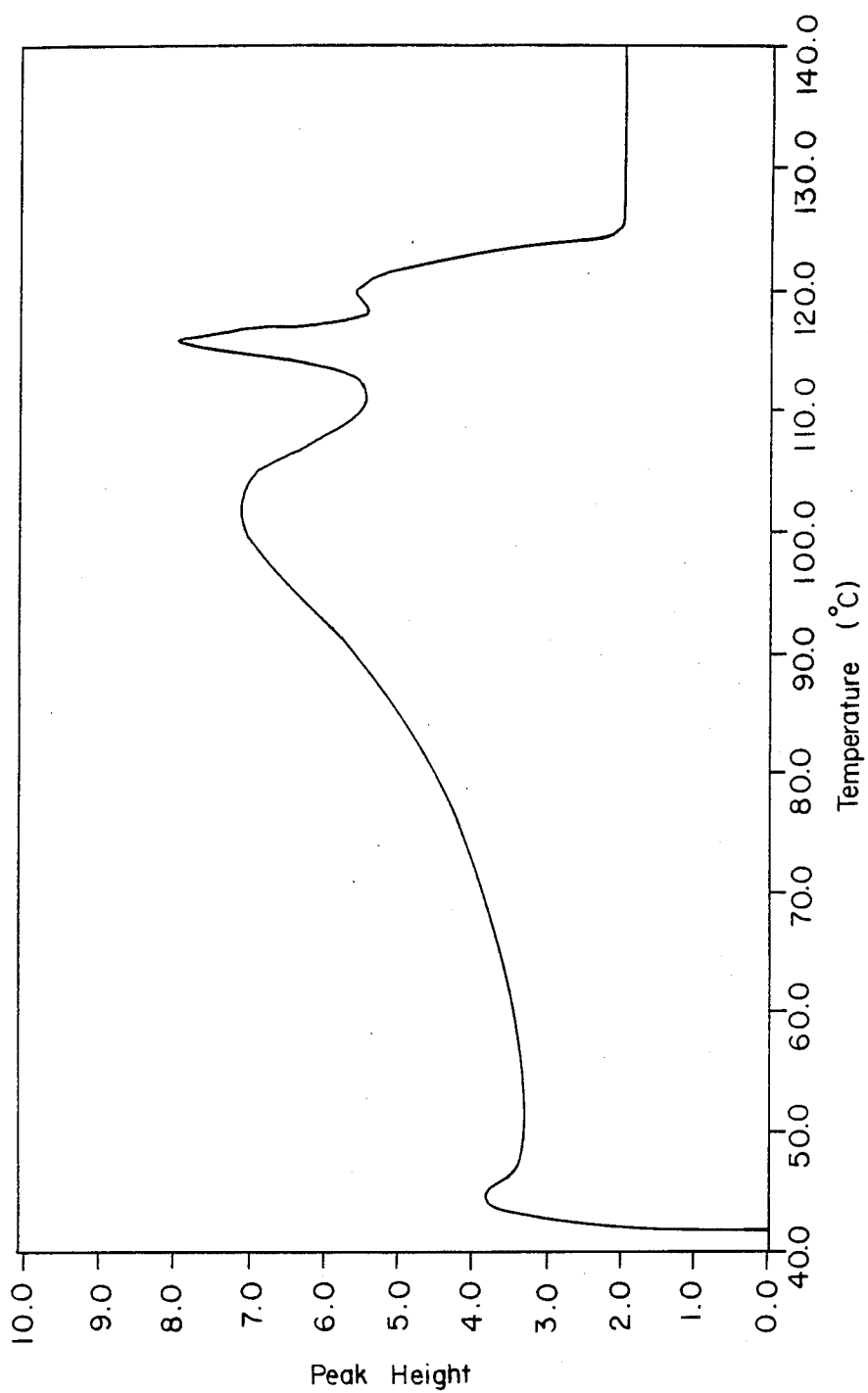
FIG. 4 is a programed-temperature thermogram of Comparative Example 4, which was determined after temperature reduction at a rate of 10° C./min followed by temperature rise at a rate of 10° C./min.

In order to examine the influence of a rate of temperature reduction preceding determination of DSC thermograms, A programed-temperature thermogram was determined for each of the uniform mixtures of Examples 1 to 3 and Ultzex ® 1520L used in Comparative Example 4 in the same manner as described above, except that the rate of temperature reduction preceding the determination was set at 10° C./min. The peak temperatures of the endothermic peaks of each thermogram are shown in Table 9. The peak temperatures of the thermograms of the same mixtures and Ultzex ® 1520L as determined in the foregoing examples (temperature reduction rate: 1° C/min) are also shown in Table 9. The thermograms of Example 2 and Comparative Example 4 are shown in FIGS. 1 and 2, respectively, in which the temperature reduction rate was 1° C./min, and in FIGS. 3 and 4, respectively, in which the temperature reduction rate was 10° C./min. On comparing FIGS. 1 and 2 with FIGS. 3 and 4, it can be seen that the peak in the higher temperature region, which is single-headed when the temperature reduction rate is 1°

C./min, is split up in some cases when the temperature is reduced at rate of 10° C./min. This splitting of peak seems to be because the lamellar crystals which have not been allowed to sufficiently grow under such rapid cooling undergo fusion-recrystallization in the subsequent temperature rise.

Figure 5:
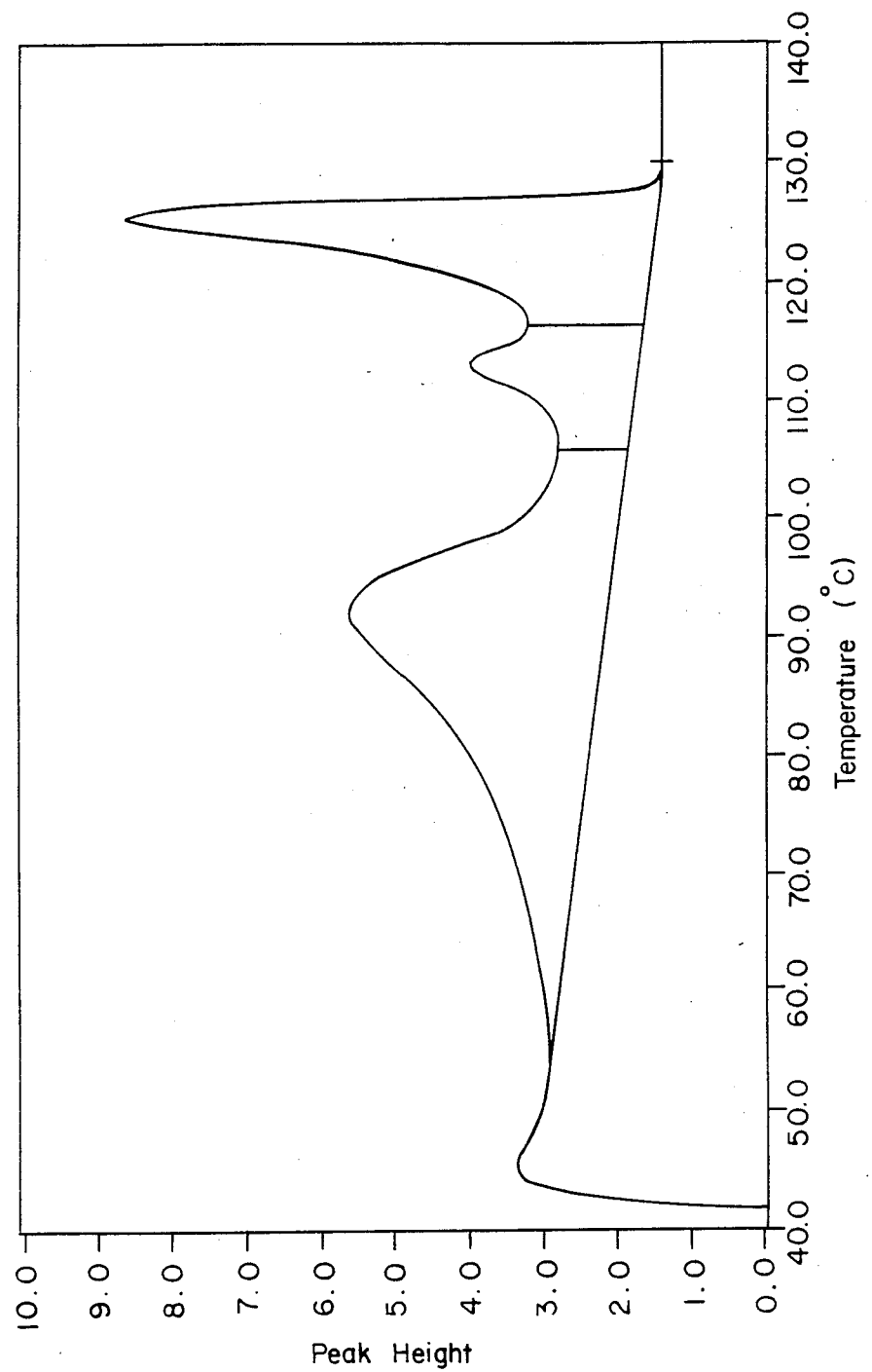
FIG. 5 is a programed-temperature thermogram of Example 2, which was determined directly from a film at a rate of temperature rise of 10° C./min.
Figure 6:
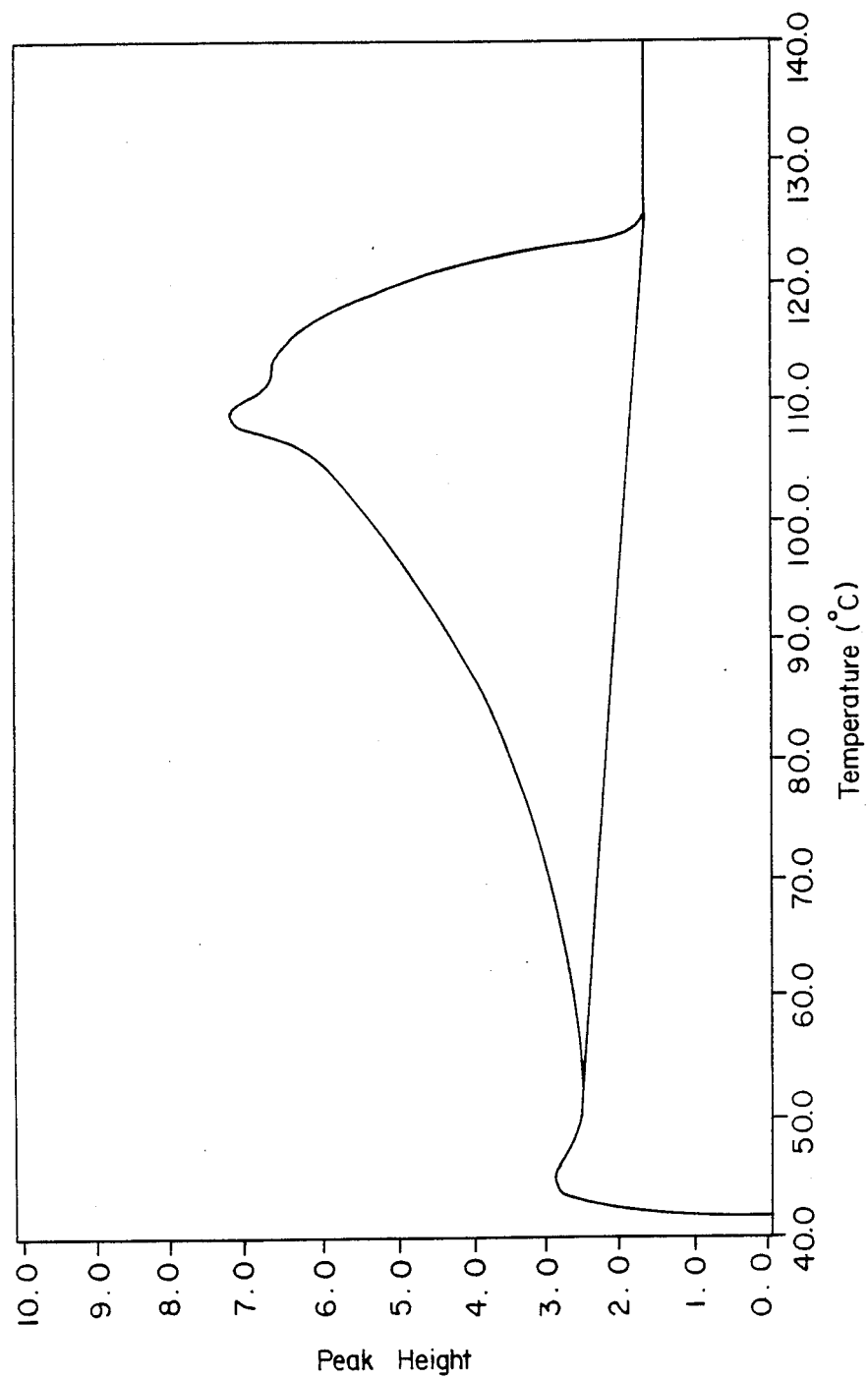
FIG. 6 is a programed-temperature thermogram of Comparative Example 4, which was determined directly from a film at a rate of temperature rise of 10° C./min.

The DSC programed-temperature thermograms of the films obtained in Example 2 and Comparative Example 4 are shown in FIGS. 5 and 6, respectively. As is shown, the film of Example 2 shows clear peaks at 92.2° C. and 125.8° C., whereas the film of Comparative Example 4 shows a broad fusion pattern having a peak at 109.0° C.

TABLE 1

| | Copolymer | | | | |
|---|---|---|---|---|---|
| | I-A | I-B | I-C | I-D | I-E |
| Feed Rate: | | | | | |
| Ethylene (kg/hr) | 1.4 | 3.4 | 3.7 | 3.5 | 3.2 |
| 1-Butene (kg/hr) | 0.6 | 4.5 | 4.4 | 3.1 | 7.0 |
| Vanadyl Trichloride (g/hr) | 0.002 | 0.2 | 0.6 | 0.07 | 0.2 |
| Ethylaluminum Sesquichloride (g/hr) | 1.2 | 1.1 | 3.0 | 1.5 | 1.8 |
| n-Butyl Perchlorocrotonate (g/hr) | 0.72 | 4.6 | — | 0.4 | 0.9 |
| Reaction Temperature (°C.) | 40 | 50 | 50 | 50 | 50 |
| Copolymer Production Rate (kg/hr) | 1.4 | 2.7 | 2.0 | 1.8 | 2.4 |
| Copolymer Produced: | | | | | |
| Density (g/cm$^3$) | 0.906 | 0.897 | 0.910 | 0.909 | 0.888 |
| MFR (g/10 min) | 2.1 | 1.7 | 1.9 | 1.7 | 1.7 |
| DSC Melting point (1C) | 92.9 | 79.8 | 97.3 | 96.5 | 65.4 |
| DSC Half Width (1C) | 19.5 | 22.3 | 16.8 | 15.4 | 21.6 |

TABLE 2

| | High-Density PE (II) | | |
|---|---|---|---|
| | II-A | II-B | II-C |
| Name (Nissan Polyethylene ®) | 1010 | 2010 | 1070 |
| MFR (g/10 min) | 1.0 | 1.0 | 8.1 |
| Density (g/cm$^3$) | 0.950 | 0.955 | 0.951 |
| DSC Melting Point (°C.) | 133.2 | 136.6 | 131.7 |
| DSC Half Width (°C.) | 5.6 | 6.0 | 5.0 |

TABLE 3

| | Comparative Example 1 | Example 1 | Example 2 | Example 3 | Comparative Example 2 | Comparative Example 3 | Comparative Example 4 |
|---|---|---|---|---|---|---|---|
| Polyethylene Mixture: | | | | | | | |
| Copolymer [I] (PHR) | I-A (100) | I-A (95) | I-A (85) | I-A (70) | I-A (30) | Sumikathene ® L (100) | Ultzex ® 1520 L (100) |
| HDPE (II) (PHR) | | II-A (5) | II-A (15) | II-A (30) | II-A (70) | | |
| Density (g/cm$^3$) | 0.905 | 0.908 | 0.913 | 0.920 | 0.913 | 0.913 | 0.913 |
| MFR (g/10 min) | 2.1 | 2.1 | 1.9 | 1.7 | 1.9 | 1.9 | 2.5 |
| DSC Analysis: | | | | | | | |
| Melting Peak (°C.) | 92.9 | 92.8 | 92.8 | 92.6 | 94.1 | 103.0 | 102.3 |
| | | 124.3 | 125.7 | 128.6 | 132.1 | 120.4 | 119.3 |
| ΔHb/ΔHa | — | 0.16 | 0.52 | 1.2 | 5.19 | 0.42 | 0.19 |
| (ΔHa + ΔHb)/ΔHt | — | 1.0 | 1.0 | 1.0 | 1.0 | 1.0 | 1.0 |
| Wa½ (°C.) | — | 19.4 | 19.9 | 21.3 | 27.4 | 34.2 | 31.0 |
| Molding Process | inflation | inflation | inflation | inflation | inflation | inflation | inflation |
| DSC Analysis of Film: | | | | | | | |
| Melting Peak (°C.) | 96.5 | 93.3 | 92.3 | 93.0 | 127.0 | 116.0 | 109.4 |
| | | 105.9 | 113.0 | 117.9 | | | |
| | | 124.2 | 125.7 | 126.4 | | | |
| ΔHb/ΔHa | — | 0.16 | 0.58 | 0.99 | — | — | — |
| (ΔHa + ΔHb)/ΔHt | — | 0.84 | 0.87 | 0.78 | — | — | — |
| Wa½(°C.) | — | 15.0 | 17.2 | 22.8 | — | — | — |
| Film Properties: | | | | | | | |
| Haze (%) | 2.5 | 3.0 | 6.1 | 9.9 | 14 | 13 | 9.8 |
| Gloss (%) | 147 | 144 | 122 | 101 | 85 | 70 | 103 |
| 1% Secant Modulus (kg/cm): | | | | | | | |
| MD | 730 | 870 | 1180 | 1750 | 3760 | 900 | 1100 |
| CD | 770 | 950 | 1410 | 2250 | 5040 | 1200 | 1400 |
| Dart Drop Impact Strength (kg · cm/mm) | 2310 | 680 | 420 | 260 | 98 | 240 | 780 |
| Elmendorf Tear Strength (kg/cm): | | | | | | | |
| MD | 32 | 37 | 42 | 42 | 8 | 17 | 41 |
| CD | 63 | 75 | 109 | 158 | 265 | 190 | 154 |

TABLE 4

| | Example 4 | Example 5 | Example 6 | Example 7 | Example 8 | Example 9 | Example 10 | Example 11 |
|---|---|---|---|---|---|---|---|---|
| Polyethylene Mixture: | | | | | | | | |
| Copolymer [I] (PHR) | I-B (85) | I-C (98) | I-C (94) | I-C (75) | I-C (95) | I-D (85) | I-D (85) | I-D (85) |
| HDPE (II) (PHR) | II-A (15) | II-A (92) | II-A (6) | II-A (25) | II-B (5) | II-A (15) | II-C (15) | II-A (15) |
| Density (g/cm$^3$) | 0.906 | 0.910 | 0.912 | 0.920 | 0.912 | 0.915 | 0.915 | 0.915 |
| MFR (g/10 min) | 1.7 | 1.7 | 1.9 | 1.9 | 1.9 | 1.6 | 2.0 | 1.5 |
| DSC Analysis: | | | | | | | | |
| Melting Peak (°C.) | 79.7 | 91.2 | 97.1 | 96.6 | 97.0 | 97.1 | 96.8 | 97.1 |
| | 125.7 | 120.3 | 122.8 | 126.7 | 124.9 | 124.9 | 124.8 | 124.9 |
| ΔHb/ΔHa | 0.79 | 0.10 | 0.21 | 0.82 | 0.19 | 0.36 | 0.36 | 0.36 |
| (ΔHa + ΔHb)/ΔHt | 1.0 | 1.0 | 1.0 | 1.0 | 1.0 | 1.0 | 1.0 | 1.0 |

TABLE 4-continued

| | | | | | | | | |
|---|---|---|---|---|---|---|---|---|
| Wa½ (°C.) | 21.8 | 17.2 | 17.2 | 19.3 | 14.0 | 17.0 | 17.4 | 17.0 |
| Molding Process | inflation | inflation | inflation | inflation | inflation | inflation | inflation | inflation |
| DSC Analysis of Film: | | | | | | | | |
| Melting Peak (°C.) | 81.4 | 98.1 | 95.9 | 96.0 | 96.5 | 96.3 | 96.3 | 95.2 |
| | 112.2 | | 106.9 | 116.8 | 109.0 | 112.4 | 111.1 | 109.9 |
| | 125.7 | 122.4 | 123.7 | 125.9 | 126.1 | 125.2 | 124.2 | 125.3 |
| ΔHb/ΔHa | 1.02 | 0.05 | 0.23 | 0.93 | 0.22 | 0.53 | 0.46 | 0.63 |
| (ΔHa + ΔHb)/ΔHt | 0.91 | 1.0 | 0.78 | 0.84 | 0.81 | 0.84 | 0.80 | 0.78 |
| Wa½ (°C.) | 17.9 | 18.9 | 17.2 | 22.7 | 14.8 | 16.9 | 17.0 | 20.8 |
| Film Properties: | | | | | | | | |
| Haze (%) | 7.0 | 6.3 | 6.7 | 12 | 11 | 7.9 | 7.9 | 3.7 |
| Gloss (%) | 107 | 119 | 116 | 97 | 89 | 99 | 103 | 142 |
| 1% Secant Modulus (kg/cm): | | | | | | | | |
| MD | 960 | 950 | 1060 | 1740 | 1140 | 1380 | 1360 | 1100 |
| CD | 1070 | 980 | 1130 | 2160 | 1280 | 1600 | 1630 | 1110 |
| Dart Drop Impact Strength (kg · cm/mm) | 2800< | 680 | 510 | 270 | 560 | 630 | 580 | 620 |
| Elmendorf Tear Strength (kg/cm): | | | | | | | | |
| MD | 52 | 29 | 31 | 33 | 33 | 36 | 36 | 30 |
| CD | 84 | 71 | 83 | 145 | 82 | 83 | 70 | 125 |

| | Example 12 | Comparative Example 5 | Comparative Example 6 | Comparative Example 7 | Example 13 | Comparative Example 8 | Comparative Example 9 |
|---|---|---|---|---|---|---|---|
| Polyethylene Mixture: | | | | | | | |
| Copolymer [I] (PHR) | Two-stage polymer (100) | I-E (70) | Sumikathene ® L (100) | I-D (100) | I-G (85) | I-G (100) | Sumikathene ® α (100) |
| HDPE (II) (PHR) | | II-A (30) | | | II-A (15) | | |
| Density (g/cm³) | 0.912 | 0.907 | 0.914 | 0.90 | 0.912 | 0.906 | 0.913 |
| MFR (g/10 min) | 1.8 | 1.5 | 2.7 | 1.7 | 1.8 | 1.8 | 2.0 |
| DSC Analysis: | | | | | | | |
| Melting Peak (°C.) | 94.8 | 63.4 | 101.4 | 96.5 | 93.5 | 93.8 | 103.6 |
| | 126.5 | 127.7 | 120.3 | | 125.2 | | 121.0 |
| ΔHb/ΔHa | 0.14 | 4.64 | 0.33 | — | 0.51 | — | 0.30 |
| (ΔHa + ΔHb)/ΔHt | 1.0 | 1.0 | 1.0 | — | 1.0 | — | 1.0 |
| Wa½ (°C.) | 13.1 | 22.3 | 31.6 | — | 19.7 | — | 33.4 |
| Molding Process | inflation | inflation | inflation | inflation | inflation | inflation | inflation |
| DSC Analysis of Film: | | | | | | | |
| Melting Peak (°C.) | 92.8 | 67.4 | 109.5 | 98.0 | 93.0 | 96.6 | 109.2 |
| | 107.3 | 117.7 | | | 111.9 | | |
| | 126.0 | 126.9 | | | 125.1 | | |
| ΔHb/ΔHa | 0.10 | 7.04 | — | — | 0.60 | — | — |
| (ΔHa + ΔHb)/ΔHt | 0.88 | 0.82 | — | — | 0.89 | — | — |
| Wa½ (°C.) | 16.0 | 17.7 | — | — | 19.3 | — | — |
| Film Properties: | | | | | | | |
| Haze (%) | 6.2 | 10.2 | 30 | 4.7 | 8.6 | 5.3 | 27.4 |
| Gloss (%) | 121 | 93 | 41 | 129 | 97 | 125 | 40 |
| 1% Secant Modulus (kg/cm): | | | | | | | |
| MD | 940 | 1250 | 1170 | 860 | 1240 | 710 | 1090 |
| CD | 990 | 1500 | 1310 | 930 | 1450 | 780 | 1260 |
| Dart Drop Impact Strength (kg · cm/mm) | 640 | 630 | 220 | 2900 | 2900< | 2900< | 900 |
| Elmendorf Tear Strength (kg/cm): | | | | | | | |
| MD | 30 | 82 | 34 | 31 | 91 | 73 | 101 |
| CD | 85 | 125 | 119 | 53 | 164 | 107 | 183 |

TABLE 5

| | Peel Strength of Heat-Sealed Area (kg/15 mm; 180° C.) | | | | | | |
|---|---|---|---|---|---|---|---|
| Heat-Sealing Temperature (°C.) | Comparative Example 1 | Example 1 | Example 2 | Example 3 | Comparative Example 2 | Comparative Example 3 | Comparative Example 4 |
| 85 | 0.00 | 0.00 | 0.00 | 0.00 | | | |
| 90 | 0.01 | 0.03 | 0.03 | 0.01 | | | 0.00 |
| 95 | 0.02 | 0.15 | 0.07 | 0.04 | | | 0.03 |
| 100 | 0.04 | 0.81 | 1.33 | 0.17 | | 0.00 | 0.06 |
| 105 | 0.24 | 2.91 | 3.80 | 0.67 | 0.00 | 0.01 | 0.69 |
| 110 | 0.53 | 4.00 | 4.79 | 3.30 | 0.03 | 0.10 | 1.96 |
| 115 | 1.21 | 5.39 | 5.36 | 3.88 | 0.04 | 0.30 | 3.10 |
| 120 | 2.81 | 5.51 | 6.36 | 4.03 | 0.08 | 2.15 | 3.88 |
| 125 | 3.83 | 5.42 | 6.01 | 5.33 | 0.15 | 4.50 | 5.36 |
| 130 | 5.55 | 5.94 | 5.79 | 6.00 | 0.21 | 4.95 | 5.38 |
| 135 | 5.34 | 6.22 | 6.19 | 5.85 | 0.47 | 5.50 | 6.58 |
| 140 | 4.78 | 6.20 | 6.44 | 5.27 | 1.48 | 5.90 | 4.94 |
| 145 | | | | | 4.67 | | |

TABLE 5-continued

Peel Strength of Heat-Sealed Area (kg/15 mm; 180° C.)

| Heat-Sealing Temperature (°C.) | Comparative Example 1 | Example 1 | Example 2 | Example 3 | Comparative Example 2 | Comparative Example 3 | Comparative Example 4 |
|---|---|---|---|---|---|---|---|
| 150 | | | | | 4.50 | | |

TABLE 6

Peel Length (mm) of Heat-Sealed Area While Hot

| Heat-Sealing Temperature (°C.) | Comparative Example 1 | Example 1 | Example 2 | Example 3 | Comparative Example 2 | Comparative Example 3 | Comparative Example 4 |
|---|---|---|---|---|---|---|---|
| 100 | | 20< | 20< | | | | |
| 105 | | 17.0 | 18.3 | | | | |
| 110 | 13.7 | 14.0 | 20< | | | | |
| 115 | | 10.5 | 10.9 | 14.2 | | 20< | 20< |
| 120 | 20< | 4.3 | 6.3 | 12.5 | | 18.2 | 14.7 |
| 125 | 15.2 | 1> | 1> | 8.6 | | 16.5 | 13.0 |
| 130 | 9.2 | 1> | 1> | 8.2 | | 13.0 | 7.5 |
| 135 | 4.4 | 1> | 1> | 6.2 | | 3.4 | 1< |
| 140 | 1> | 1> | 1> | 3.0 | | 1.2 | 1< |
| 145 | cut* | 2.7 | 1> | 4.9 | | 4.0 | 1< |
| 150 | | cut | 1.5 | 1.8 | 20< | cut | 1< |
| 155 | | | cut | cut | 16.1 | | cut |
| 160 | | | | | 7.9 | | |
| 165 | | | | | 4.7 | | |
| 170 | | | | | cut | | |

Note:
*The sealant layer was cut off.

TABLE 7

Peel Strength of Heat-Sealed Area (kg/15 mm; 180° C.)

| Heat-Sealing Temp. (°C.) | Ex. 4 | Ex. 5 | Ex. 6 | Ex. 7 | Ex. 8 | Ex. 9 | Ex. 10 | Ex. 11 | Ex. 12 | Comp. Ex. 5 | Comp. Ex. 6 | Comp. Ex. 7 | Ex. 13 | Comp. Ex. 8 | Comp. Ex. 9 |
|---|---|---|---|---|---|---|---|---|---|---|---|---|---|---|---|
| 70 | 0.03 | | | | | | | | | 0.03 | | | 0 | | |
| 75 | 0.07 | | | | 0 | | | | | 1.70 | | | 0.01 | 0 | |
| 80 | 2.03 | | | | | 0.03 | | | | 3.28 | | | 0.02 | 0.01 | 0 |
| 85 | 2.95 | 0 | 0 | 0 | 0 | 0.73 | 0 | 0 | 0 | 4.17 | 0 | 0.03 | 0.01 | 0.01 | |
| 90 | 3.42 | 0.07 | 0.17 | 0.03 | 0.06 | 1.13 | 0.01 | 0.01 | 0.10 | 5.35 | 0.01 | 0.02 | 0.16 | 0.23 | 0.02 |
| 95 | 3.80 | 0.83 | 0.93 | 0.09 | 1.35 | 1.47 | 0.21 | 0.04 | 1.00 | 4.83 | 0.02 | 0.15 | 1.10 | 0.47 | 0.05 |
| 100 | 3.76 | 2.09 | 2.19 | 0.76 | 2.71 | 3.28 | 1.45 | 1.23 | 2.51 | 4.94 | 0.04 | 2.15 | 1.82 | 1.58 | 0.33 |
| 105 | 4.23 | 3.43 | 4.00 | 3.20 | 4.56 | 3.83 | 1.45 | 2.02 | 4.22 | 4.80 | 0.42 | 3.03 | 2.28 | 2.47 | 1.87 |
| 110 | 4.25 | 3.81 | 4.45 | 3.12 | 5.39 | 4.23 | 1.88 | 2.15 | 5.12 | 5.03 | 1.83 | 4.05 | 3.12 | 3.30 | 2.32 |
| 115 | 4.42 | 4.26 | 4.30 | 3.56 | 5.65 | 4.80 | 2.42 | 3.20 | 5.60 | 5.12 | 2.08 | 4.58 | 3.25 | 3.85 | 3.92 |
| 120 | 4.57 | 4.45 | 3.59 | 3.62 | 5.74 | 5.13 | 2.97 | 3.38 | 5.70 | 5.63 | 3.85 | 4.93 | 3.65 | 4.13 | 4.32 |
| 125 | 4.88 | | | 4.17 | 5.33 | 5.47 | 3.30 | 3.95 | 5.66 | 5.48 | 4.78 | 4.90 | 4.20 | 4.20 | 4.70 |
| 130 | 4.95 | | | 4.63 | | 5.87 | 4.20 | 4.80 | 5.35 | 5.38 | 5.17 | 5.00 | 4.75 | 4.42 | 5.57 |
| 135 | 5.00 | | | | | 5.88 | 4.95 | 5.72 | 5.80 | 6.03 | | 4.93 | 5.18 | 4.83 | 5.65 |
| 140 | 5.22 | | | | | 5.75 | 5.32 | 5.77 | 5.12 | 5.88 | 5.33 | 4.87 | 5.27 | 4.98 | 5.75 |

TABLE 8

Peel Length (mm) of Heat-Sealed Area While Hot

| Heat-Sealing Temp. (°C.) | Ex. 4 | Ex. 5 | Ex. 6 | Ex. 7 | Ex. 8 | Ex. 9 | Ex. 10 | Ex. 11 | Ex. 12 | Comp. Ex. 5 | Comp. Ex. 6 | Comp. Ex. 7 | Ex. 13 | Comp. Ex. 8 | Comp. Ex. 9 |
|---|---|---|---|---|---|---|---|---|---|---|---|---|---|---|---|
| 80 | 20< | | | | | | | | | 13.9 | | | | | |
| 85 | 12.5 | | | | | | | | | 10.2 | | | | | |
| 90 | 8.0 | | | | | | | | | 7.1 | | | | | |
| 95 | 6.0 | | | | | 20< | | | | 9.1 | | | 20< | 20< | |
| 100 | 7.8 | 20< | 20< | 20< | 20< | 18.6 | 20< | 20< | 20< | 8.2 | | 20< | 13.0 | 13.8 | |
| 105 | 3.3 | 13.3 | 11.0 | 17.6 | 18.1 | 6.0 | 15.5 | 16.5 | 16.1 | 9.9 | | 15.4 | 10.0 | 10.2 | 20< |
| 110 | 5.2 | 12.7 | 7.2 | 15.0 | 6.9 | 1.4 | 11.5 | 11.4 | 7.0 | 10.9 | 20< | 5.1 | 4.0 | 6.8 | 14.8 |
| 115 | 6.9 | 4.7 | 3.7 | 11.5 | 2.5 | 1.5 | 10.5 | 8.8 | 3.1 | 12.3 | 13.5 | 2.9 | 5.2 | 4.5 | 11.0 |
| 120 | 7.5 | 2.3 | 2.6 | 6.8 | 2.6 | 1.5 | 5.4 | 4.7 | 2.3 | 1.4.4 | 8.2 | 2.1 | 1.2 | 1.5 | 6.0 |
| 125 | 8.1 | 2.6 | 2.5 | 5.7 | 2.9 | 3.9 | 6.1 | 3.7 | 2.1 | 12.7 | 4.3 | 2.9 | 0.5 | 0.8 | 2.5 |
| 130 | 8.8 | 3.0 | 2.6 | 4.6 | 4.0 | 4.3 | 3.6 | 2.3 | 2.5 | 14.6 | 2.2 | 3.0 | 0.5 | 2.0 | 1.5 |
| 135 | 6.9 | 4.5 | 3.9 | 4.3 | 5.1 | 4.1 | 4.1 | 3.7 | 2.2 | 16.7 | 2.7 | 5.2 | 0.5 | 1.5 | 0.5 |
| 140 | 10.1 | 4.9 | 4.9 | 3.8 | 4.8 | 4.7 | 5.8 | 4.8 | 3.3 | 14.8 | 3.8 | 7.1 | 1.3 | 3.0 | 0.5 |
| 145 | 11.9 | 6.7 | 7.4 | 5.4 | 8.5 | 5.5 | 9.9 | 5.4 | 5.0 | 9.9 | 5.8 | 11.0 | 1.8 | 4.0 | 1.0 |
| 150 | 14.2 | 8.6 | 8.4 | 7.7 | | 10.3 | 13.3 | 7.9 | 8.4 | 10.3 | 8.0 | 15.5 | 2.7 | 6.0 | 2.0 |

TABLE 9

| Example No. | Endothermic Peak Temperature (°C.) Rate of Temperature Reduction | | | |
|---|---|---|---|---|
| | 1° C./min | | 10° C./min | |
| Example 1 | 92.8 | 124.3 | 93.6 (121.0) | 124.8 |
| Example 2 | 92.8 | 125.7 | 92.3 123.6 | (126.5)* |
| Example 3 | 92.6 | 128.6 | 91.9 126.1 | |
| Comparative Example 4 | 102.3 | 119.3 | 102.6 116.0 | (119.8)* |

Note:
*The parentheses indicate that the peak looks like a peak due to a peak-height change of less than 1/10 the maximum peak-height.

Making comparisons between Example 2 and Comparative Examples 3 and 4 in Tables 5 and 6, between Examples 5 to 10 and 12 and Comparative Example 6 in Tables 7 and 8, and between Example 13 and Comparative Example 9 in Tables 7 and 8, it can be seen that the films according to the present invention begin to exhibit heat-sealing properties and hot tack at lower temperatures and also the temperature range in which hot tack can be exhibited is markedly broader as compared with the comparative films. It can further be seen from Table 8 that the composite film of Comparative Example 5, in which the density of the polyethylene mixture is substantially equal to those of the polyethylene mixtures of Examples 4 and 5, shows a longer minimum peel length, i.e., lower strength, than Examples 4 and 5. Furthermore, making comparisons between the Examples and Comparative Examples with densities being equal. The films of the Examples are incomparably superior to the films obtained from the conventional L-LDPE in transparency (haze), gloss, and impact strength as well as nerve (expressed in terms of secant modulus at 1% strain).

Thus, the films according to the present invention are decidedly excellent as packaging film as compared with the conventional films.

As discussed above, the present invention provides low-density polyethylene films which highly satisfy all the physical properties required for use as packaging film, i.e., heat-sealing properties, hot tack, transparency, gloss, nerve, impact strength, and tear strength, and are therefore suitable as packaging film. The present invention also provides materials for providing such excellent films.

While the invention has been described in detail and with reference to specific embodiments thereof, it will be apparent to one skilled in the art that various changes and modifications can be made therein without departing from the spirit and scope thereof.

What is claimed is:

1. An ethylene-α-olefin copolymer comprising ethylene and an α-olefin having from 4 to 10 carbon atoms, the copolymer having an α-olefin content of from 1.0 to 8.0 mol %, a density of from 0.900 to 0.930 g/cm$^3$, and a melt flow rate of from 0.1 to 100 g/10 min., the programed-temperature thermogram of said copolymer as determined with a differential scanning calorimeter after being completely melted and then gradually cooled showing an endothermic peak (a) in a range of from 75° to 100° C. and an endothermic peak (b) in a range of from 120° to 140° C., with the ratio of an endotherm at the endothermic peak (b), αHb, to an endotherm at the endothermic peak (a), αHa, being from 0.03 to 2.0.

2. A film comprising an ethylene-α-olefin copolymer comprising ethylene and an α-olefin having from 4 to 10 carbon atoms, the copolymer having an αolefin content of from 1.0 to 8.0 mol %, a density of from 0.900 to 0.930 g/cm$^3$, and a melt flow rate of from 0.1 to 100 g/10 min., the programed-temperature thermogram of said copolymer as determined with a differential scanning calorimeter after being completely melted and then gradually cooled showing an endothermic peak (a) in a range of from 75° to 100° C. and an endothermic peak (b) in a range of from 120° to 140° C., with the ratio of an endotherm at the endothermic peak (b), ΔHb, to an endotherm at the endothermic peak (a), ΔHa, being from 0.03 to 2.0.

3. A composite film composed of a base having provided on at least one surface thereof a film comprising an ethylene-α-olefin copolymer comprising ethylene and an α-olefin having from 4 to 10 carbon atoms, the copolymer having an α-olefin content of from 1.0 to 8.0 mol %, a density of from 0.900 to 0.930 g/cm$^3$, and a melt flow rate of from 0.1 to 100 g/10 min., the programed-temperature thermogram of said copolymer as determined with a differential scanning calorimeter after being completely melted and then gradually cooled showing an endothermic peak (a) in a range of from 75° to 100° C. and an endothermic peak (b) in a range of from 120° to 140° C., with the ratio of an endotherm at the endothermic peak (b), ΔHb, to an endotherm at the endothermic peak (a), ΔHa, being from 0.03 to 2.0.

4. A low-density polyethylene film whose programed-temperature thermogram as determined directly for the film state with a differential scanning calorimeter shows an endothermic peak (a) in a range of from 75° to 100° C. and an endothermic peak (b) in a range of from 120° to 140° C., with the ratio of an endotherm at the endothermic peak (b), ΔHb, to an endotherm at the endothermic peak (a), ΔHa, being from 0.03 to 2.0.

5. A composite film composed of a base having provided on at least one surface thereof a low-density polyethylene film whose programed-temperature thermogram as determined directly for the film state with a differential scanning calorimeter shows an endothermic peak (a) in a range of from 75° to 100° C. and an endothermic peak (b) in a range of from 120° to 140° C., with the ratio of an endotherm at the endothermic peak (b), ΔHb, to an endotherm at the endothermic peak (a), ΔHa, being from 0.03 to 2.0.

6. A polyethylene mixture having a density of from 0.900 to 0.930 g/cm$^3$ and a melt flow rate of from 0.1 to 100 g/10 min., which comprises (I) from 60 to 99 parts by weight of an ethylene-α-olefin random copolymer comprising ethylene and an α-olefin having from 4 to 10 carbon atoms, the copolymer having an α-olefin content of from 2.0 to 10 mol % and a density of from 0.895 to 0.915 g/cm$^3$, the programed-temperature thermogram of said copolymer as determined with a differential scanning calorimeter after being completely melted and then gradually cooled showing an endothermic peak in a range of from 75° to 100° C., with the ratio of an endotherm at said peak to the total endotherm being at least 0.8, and (II) from 1 to 40 parts by weight of a high-density polyethylene having a density of at least 0.945 g/cm$^3$, the programed-temperature thermogram of said high-density polyethylene as determined with a differential scanning calorimeter after being completely melted and allowed to cool showing an endothermic peak at 125° C. or higher, wherein the sum of (I) and (II) amounts to 100 parts by weight.

7. A film comprising a polyethylene mixture having a density of from 0.900 to 0.930 g/cm$^3$ and a melt flow rate of from 0.1 to 100 g/10 min., which comprises (I) from 60 to 99 parts by weight of an ethylene-α-olefin random copolymer comprising ethylene and an α-olefin having from 4 to 10 carbon atoms, the copolymer having an α-olefin content of from 2.0 to 10 mol % and a density of from 0.895 to 0.915 g/cm$^3$, the programed-temperature thermogram of said copolymer as determined with a differential scanning calorimeter after being completely melted and then gradually cooled showing an endothermic peak in a range of from 75° to 100° C., with the ratio of an endotherm at said peak to the total endotherm being at least 0.8, and (II) from 1 to 40 parts by weight of high-density polyethylene having a density of at least 0.945 g/cm$^3$, the programed-temperature thermogram of said high-density polyethylene as determined with a differential scanning calorimeter after being completely melted and allowed to cool showing an endothermic peak at 125° C. or higher, wherein the sum of (I) and (II) amounts to 100 parts by weight.

8. A composite film composed of a base having provided on at least one surface thereof a film comprising a polyethylene mixture having a density of from 0.900 to 0.930 g/cm$^3$ and a melt flow rate of from 0.1 to 100 g/10 min., which comprises (I) from 60 to 99 parts by weight of an ethylene-α-olefin random copolymer comprising ethylene and an α-olefin having from 4 to 10 carbon atoms, the copolymer having an α-olefin content of from 2.0 to 10 mol % and a density of from 0.895 to 0.915 g/cm$^3$, the programed-temperature thermogram of said copolymer as determined with a differential scanning calorimeter after being completely melted and then gradually cooled showing an endothermic peak in a range of from 75° to 100° C., with the ratio of an endotherm at said peak to the total endotherm being at least 0.8, and (II) from 1 to 40 parts by weight of a high-density polyethylene having a density of at least 0.945 g/cm$^3$, the programed-temperature thermogram of said high-density polyethylene as determined with a differential scanning calorimeter after being completely melted and allowed to cool showing an endothermic peak at 125° C. or higher, wherein the sum of (I) and (II) amounts to 100 parts by weight.

* * * * *